(12) United States Patent
Minor et al.

(10) Patent No.: US 9,874,319 B2
(45) Date of Patent: Jan. 23, 2018

(54) MULTIPLE-LASER LIGHT SOURCE

(71) Applicant: MTT INNOVATION INCORPORATED, Vancouver (CA)

(72) Inventors: Johannes Minor, Vancouver (CA); Gerwin Damberg, Vancouver (CA); Raveen Kumaran, Burnaby (CA); Anders Ballestad, Vancouver (CA); Eric Jan Kozak, Burnaby (CA); Gil Rosenfeld, North Vancouver (CA); Eran Elizur, Vancouver (CA)

(73) Assignee: MTT Innovation Incorporated, Vancouver (CA)

( * ) Notice: Subject to any disclaimer, the term of this patent is extended or adjusted under 35 U.S.C. 154(b) by 0 days.

(21) Appl. No.: 15/418,505

(22) Filed: Jan. 27, 2017

(65) Prior Publication Data

US 2017/0138545 A1    May 18, 2017

Related U.S. Application Data

(63) Continuation of application No. PCT/CA2015/050778, filed on Aug. 14, 2015.
(Continued)

(51) Int. Cl.
  *G02B 27/10* (2006.01)
  *G02B 26/00* (2006.01)
(Continued)

(52) U.S. Cl.
  CPC ............... *F21K 9/60* (2016.08); *F21K 9/61* (2016.08); *F21V 29/90* (2015.01);
(Continued)

(58) Field of Classification Search
  CPC .. G02B 27/145; G02B 3/0056; G02B 3/0062; G02B 27/30; G02B 27/0961;
(Continued)

(56) References Cited

U.S. PATENT DOCUMENTS

| 8,547,641 | B2 * | 10/2013 | Capolla | G02B 19/0057 359/618 |
| 2004/0104902 | A1 * | 6/2004 | Fujii | H04N 9/3129 345/204 |

(Continued)

FOREIGN PATENT DOCUMENTS

| CA | 2088497 A1 | 2/1992 |
| CA | 2443494 A1 | 3/2005 |

(Continued)

*Primary Examiner* — Dwayne A Pinkney
(74) *Attorney, Agent, or Firm* — Perkins Coie LLP

(57) ABSTRACT

A light source includes a plurality of laser diodes or other light emitters. Beams of light from the light emitters are steered to provide n array of parallel beams that illuminate a target area with an array of patches of light. In some embodiments the parallel beams are de-magnified to form the array of patches of light. Such a light source has application in illuminating dynamically-addressable focusing elements such as phase modulators, deformable mirrors and dynamically addressable lenses. Light projectors for a wide variety of applications may combine a light source as described herein with a dynamically-addressable focusing element to project defined patterns of light.

18 Claims, 16 Drawing Sheets

Related U.S. Application Data

(60) Provisional application No. 62/037,543, filed on Aug. 14, 2014.

(51) Int. Cl.
*G02F 1/03* (2006.01)
*G02B 17/00* (2006.01)
*G02B 5/08* (2006.01)
*F21K 9/60* (2016.01)
*G02B 26/08* (2006.01)
*F21V 29/90* (2015.01)
*F21K 9/61* (2016.01)
*F21Y 115/30* (2016.01)
*F21Y 115/10* (2016.01)

(52) U.S. Cl.
CPC ....... *G02B 26/0833* (2013.01); *F21Y 2115/10* (2016.08); *F21Y 2115/30* (2016.08)

(58) Field of Classification Search
CPC .... G02B 5/045; G02B 3/0012; G02B 27/126; G02B 17/086; G02B 17/08; G02B 27/144; G02B 27/1013; G02B 27/283; G02B 26/0841; G02B 26/001; G02B 26/105; G02B 6/2766; B60R 1/12; B60R 1/082; Y02E 10/47; F24J 2/145; B82Y 20/00; H04N 9/3197; G02F 1/015; G02F 1/0333; G02F 1/315; G02F 1/31; G02F 1/29

USPC ........ 359/618–625, 627, 726–727, 839, 850, 359/853, 867, 638–641, 495, 290–292, 359/223–225, 245, 260–263, 298, 198, 359/301–303, 317–318, 237, 242, 295
See application file for complete search history.

(56) References Cited

U.S. PATENT DOCUMENTS

| | | | |
|---|---|---|---|
| 2005/0058175 A1* | 3/2005 | Gross | B23K 26/067 372/98 |
| 2009/0116520 A1* | 5/2009 | Oozeki | H01S 3/08036 372/32 |
| 2013/0077308 A1* | 3/2013 | Svensen | G02B 19/0066 362/247 |
| 2014/0043352 A1* | 2/2014 | Damberg | H04N 9/3147 345/589 |

FOREIGN PATENT DOCUMENTS

| | | |
|---|---|---|
| WO | 2015054797 A1 | 4/2015 |
| WO | 2015172236 A1 | 11/2015 |
| WO | 2015184549 A1 | 12/2015 |
| WO | 2016015163 A1 | 2/2016 |

* cited by examiner

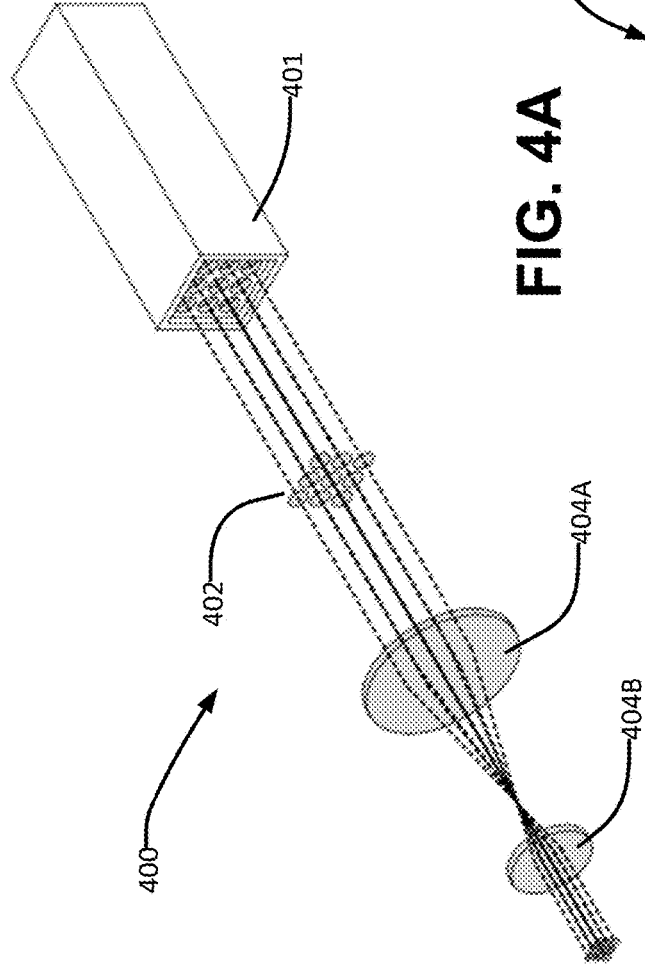
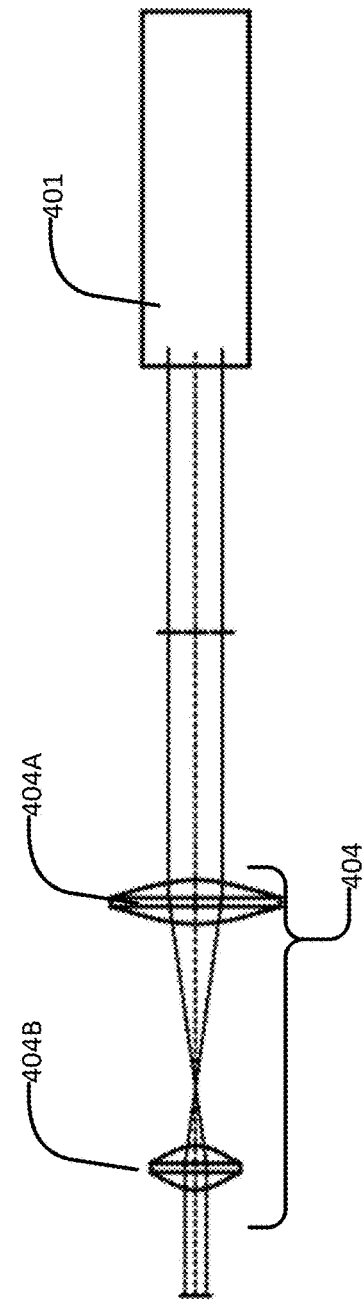
FIG. 4A
FIG. 4B

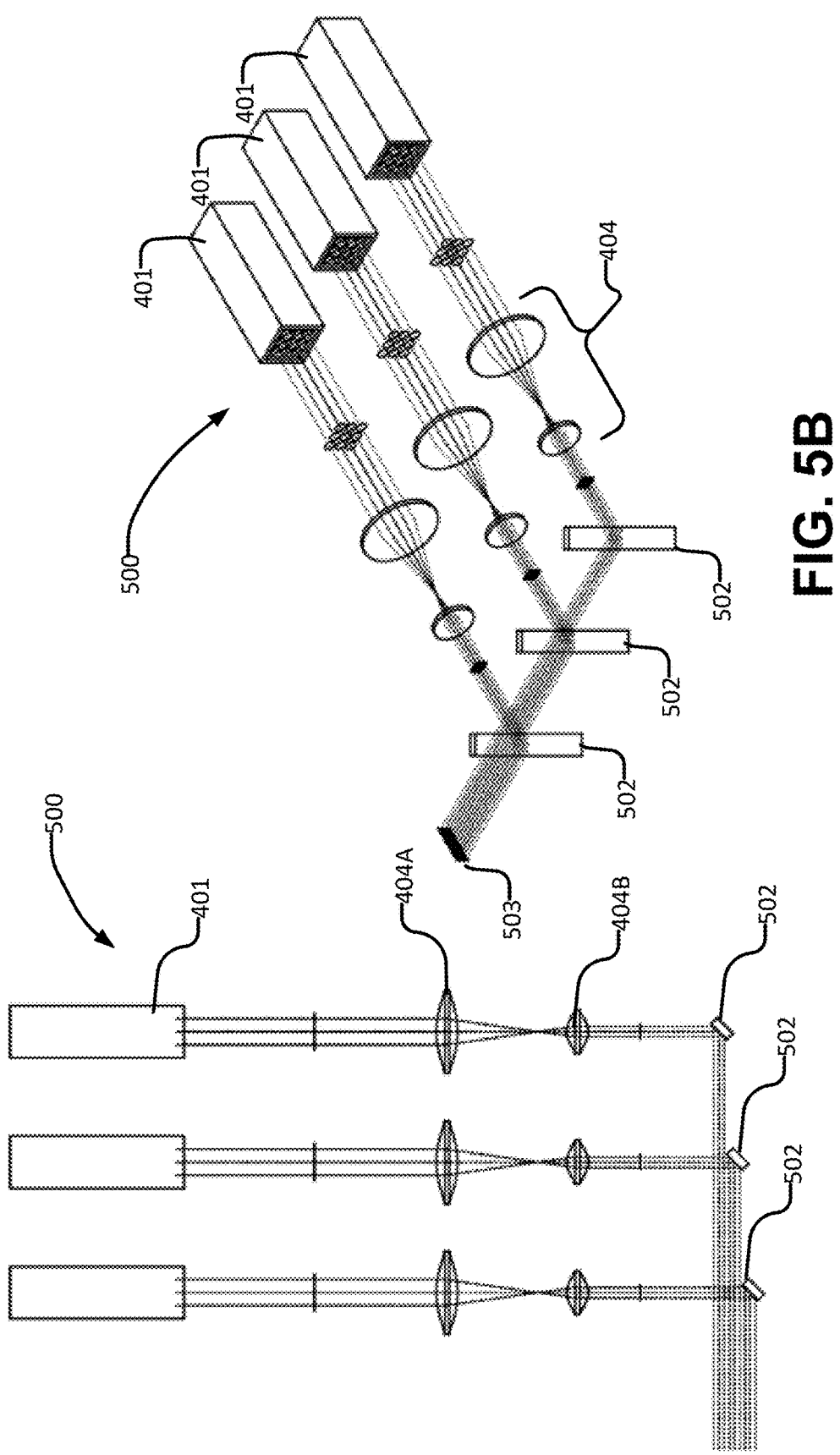

FRAME 1

FRAME 2

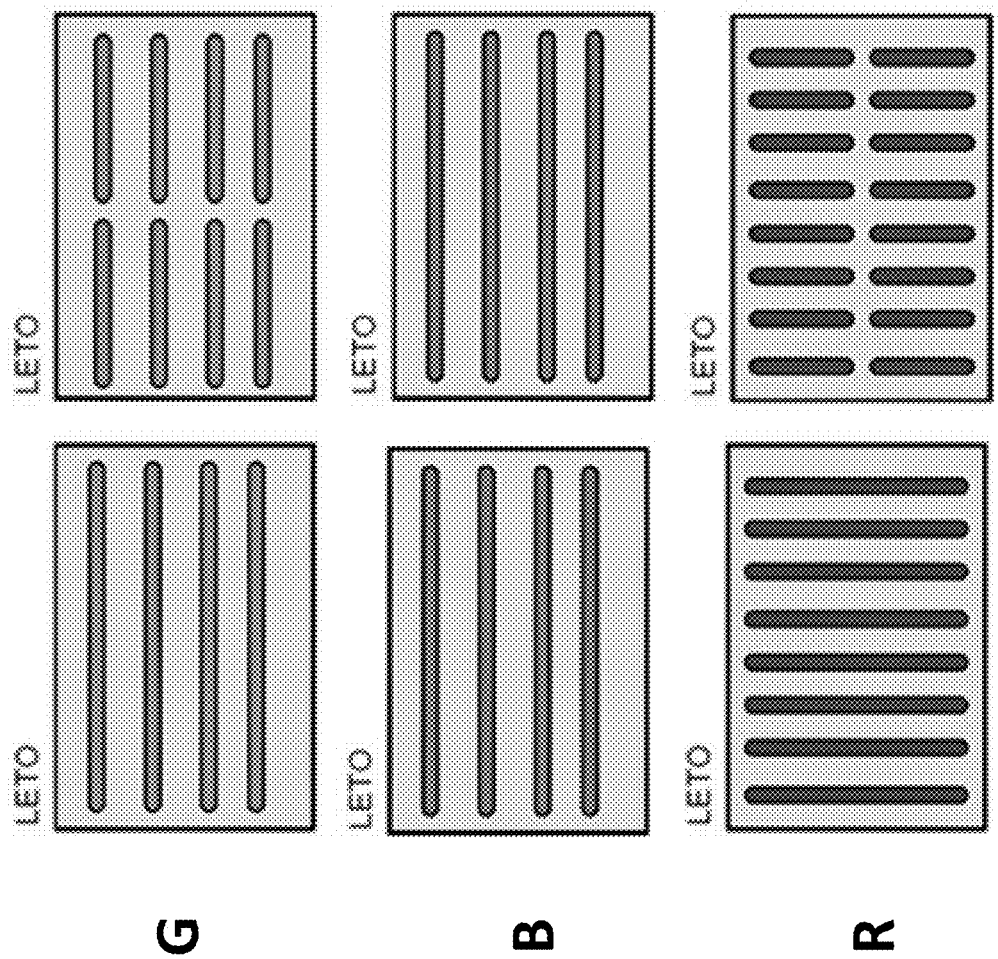

MULTIPLE-LASER LIGHT SOURCE

CROSS-REFERENCE TO RELATED APPLICATIONS

This application is a continuation of PCT International Application No. PCT/CA2015/050778 filed 14 Aug. 2015 which is incorporated herein by reference for all purposes. PCT International Application No. PCT/CA2015/050778 claims priority from U.S. application Ser. No. 62/037543 filed 14 Aug. 2014. This application claims the benefit under 35 U.S.C. § 119 of U.S. application Ser. No. 62/037543 filed 14 Aug. 2014 and entitled MULTIPLE-LASER LIGHT SOURCE, which is hereby incorporated herein by reference for all purposes.

FIELD

This invention relates to light projectors. Some embodiments may be applied to project images for viewing. Other embodiments may be applied to create structured light for illumination or other purposes. Embodiments have example application in digital cinema, TV and home theater, portable and personal projection (military, mobile, etc.), indoor and outdoor personal and large screen advertising and information dissemination, signs/advertising/billboards/outdoor advertising, large-venue and live performance, medical imaging, virtual reality, computer gaming, office presentations and collaborative work, head-up displays in cars and other vehicles, smart illumination such as adaptive car head-lights, theatre spotlights, security/architectural lighting, high contrast planetarium projectors, indoor and outdoor general illumination systems, street-lighting, road-lighting, aviation lighting systems, high-contrast simulation displays such as flight simulators, and small-scale structured lighting for 2D and 3D printing, and laser micro-machining.

BACKGROUND

There are many situations where it is desired to create a light field that has a specified luminance profile. Light projection systems have a very wide range of applications from architectural lighting to the display of lifelike images. The projected light patterns can be dynamic (e.g. video), static (used for static images or static applications like the beams of typical car headlights projected through a lens onto the road, made by arbitrarily shaped optical surfaces, etc.). Light may be projected onto a wide range of screens and other surfaces which may be flat or curved. Such surfaces may be fully reflective (like a canvas used in a cinema, a wall or a building) or partially reflective (such as the windshield of a vehicle). Screens may be low-gain or high-gain, Lambertian or highly directional, high-contrast or lower in contrast. Light may be projected onto solid objects or onto a medium in a volume (such as fog).

Markets for and applications of light projectors include digital cinema, in-door and out-door advertising, medical imaging (both for display of images, as well as capture by a smart light source), large venue and live events or performances, automotive heads up displays, car head-lights and rear-lights, automotive entertainment and information displays, home-theatre, portable business projection, television and displays for consumer applications, military applications, aviation applications (like cockpit displays, smart landing-assistance, individual passenger entertainment displays), structured light sources for industrial applications, automotive headlights and other applications. Structured light may also be used for high precision applications, such as curing ink or other material for 2D or 3D printing, or steering light for laser micro-machining.

Various devices may be used to spatially modulate light. These may be called spatial light modulators (SLMs). Most SLMs provide a 2D array of independently and individually addressable pixels. Some examples of SLMs are reflective SLMs such as digital micro-mirror devices (DMDs), liquid crystal on silicon (LCoS) devices and transmissive SLMs such as LCD panels, transmissive LCD chips such as high-temperature polysilicon (HTPS) or low-temperature polysilicon (LTPS); and partially reflective/partially transmissive SLMs such as micro-electro-mechanical systems (MEMS) based systems in which some of incident light is transmitted and some of incident light is reflected. Most readily available spatial light modulation technologies are subtractive. These SLM technologies operate by absorbing or removing undesired light.

Other types of devices may controllably alter the nature and/or distribution of light using techniques that are not primarily subtractive. For example, the light redistributor may exploit interference of electro-magnetic waves (light), to modulate the distribution of light by controlling its phase characteristics and/or modulate the frequency of the light in order to change the apparent colour of light. Both of these examples show how light can be changed without converting energy from the light into wasted heat by absorbing the light.

Examples of dynamically-addressable focusing elements include: transmissive 2D arrays of controllable liquid crystal compartments with the property that the compartments can be controlled to selectively retard the phase of light, effectively causing a change in path-length. Devices that can controllably adjust the phase of light of different areas are called Phase Modulating Devices (PMD). PMDs may be transmissive or reflective. Some PMDs can individually control phase in a 2D array made up of a large number of pixels. A dynamically-addressable focusing element may also affect the polarization of light. Some devices may alter several light properties simultaneously.

Other types of dynamically-addressable focusing element comprise one or more scanning mirrors, such as a 2D or 3D microelectromechanical system (MEMS); and/or one or more deformable lenses or mirrors or other optical elements. A dynamically-addressable focusing element may also or in the alternative comprise one or more optical switches.

Various sources can be used for illuminating SLMs, PMDs, imaging chips, or any other light re-distributing device, including arc lamps, light-emitting diodes (LEDs), LEDs plus phosphor, lasers, lasers plus phosphors. Each light source may emit light of different shapes, intensities and profiles. Traditional approaches to combining multiple light sources into a single higher-powered source include coupling light into optical fibres, and knife edge mirror beam combining, relaying into an integration rod, or some other optical averaging device.

However, in some cases, the useful characteristics of individual low-powered light sources are not preserved when combined using the traditional approaches, and higher-powered single-emitters are either not available, or have a prohibitively high cost per watt of light. For example, when light from multiple laser diodes is combined some of the characteristics affected are:

Coherence: When coupling light from multiple discrete laser diodes or laser diode bars into a multi-mode fibre, or combining multiple laser beams into a single beam using a knife edge mirror array plus lens, coherence is lost.

Polarization: The light at the output of a multi-mode fibre is no longer polarized, so some polarization recovery techniques must be used for applications that require polarized light.

There is a need for light sources and projectors that effectively combine light from multiple light sources. There is a particular need for cost-effective light sources and projectors in which light from multiple light sources can be manipulated to yield desired light patterns having desired optical characteristics.

SUMMARY

This invention has a number of aspects. One aspect provides light sources that combine light from a plurality of individual lower-powered light emitters (which, in some non-limiting embodiments comprise laser diodes or other laser light sources and in other embodiments comprise non-laser light sources—which are solid-state light sources in some embodiments). The light sources may emit light in the form of arrays of discrete, collimated, non-overlapping patches. In some embodiments, optical paths provided by the light source cause the individual patches to have desired optical characteristics such as desired polarizations and/or coherence. Another aspect provides methods for illuminating a dynamically-addressable focusing element. Another aspect provides light projectors incorporating light sources as described herein.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 4A and 4B illustrate light profile resizing.

FIG. 5A and 5B illustrate combining arrays of light beams from several light sources to yield a larger array of light beams.

FIGS. 16A and 16B schematically illustrate possible color imaging modes and ways to scale up or down optical power in a projector.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Several novel approaches have been devised for tiling light from multiple sources in a parallel, collimated fashion. It is advantageous in some applications that the tiled light patches have minimal overlap with one another. In any of these approaches the light patches may be arrayed on a surface of a dynamically-addressable focusing element such as a phase modulator (PMD).

Adjustable Diode Array, Fixed Mirrors

A two-stage array of knife-edge mirrors can be used to tile a two dimensional array of lower-powered light sources, such as LEDs or laser diodes, to cover the active area of an imaging chip with discrete, non-overlapping patches of light. Each discrete laser diode (or other light emitter) is mounted in a holder with built-in X, Y and angular adjustment, and a lens for capturing and collimating the light. The holders each comprise a two-axis stage, and a holder with a tip/tilt adjustment in some embodiments.

Figure 1B:
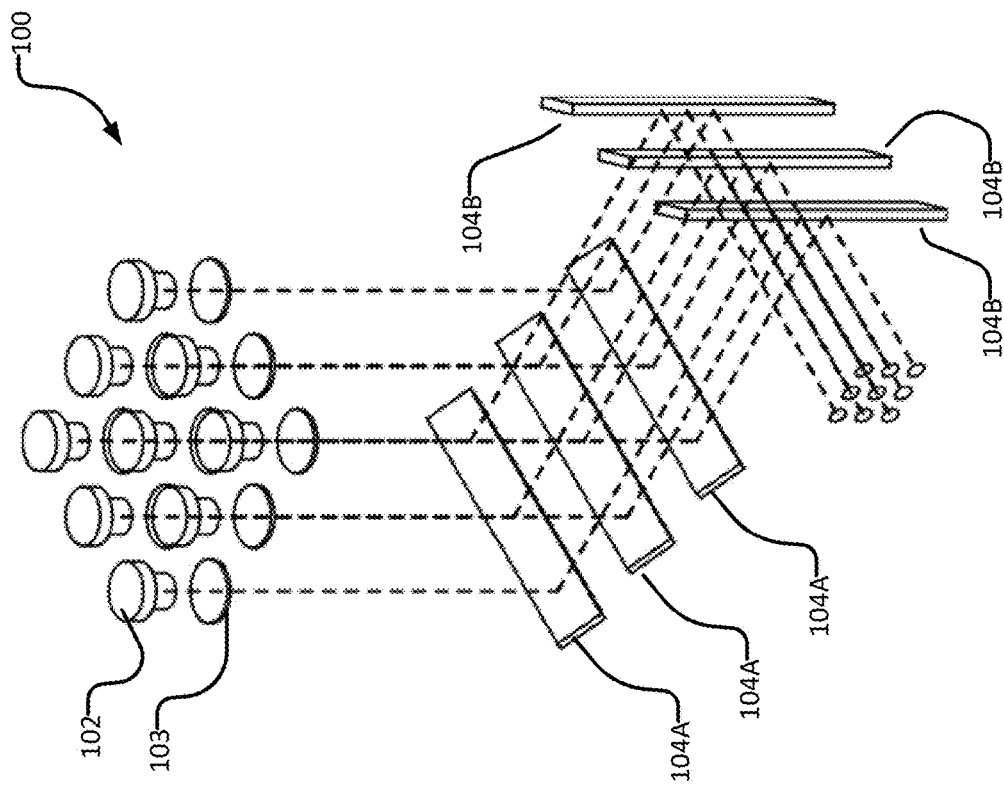
FIGS. 1A and 1B illustrate a light source comprising a fixed diode array with multiple mirrors.
Figure 1A:
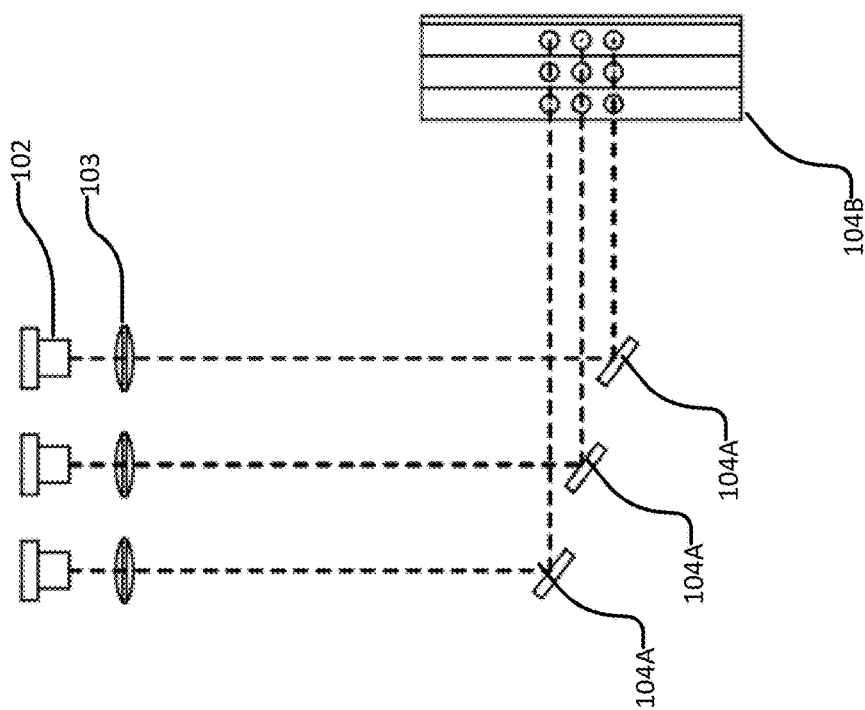

This limits the compactness of the light source arrangement, so two arrays of knife edge mirrors are used, oriented 90 degrees to each other. FIGS. 1A and 1B show an example light source 100 which applies this type of approach. Light source 100 includes light emitters 102, lenses 103, knife-edge mirrors 104A and 104B. Mirrors 104A and 104B are arranged at 90 degrees to one another.

If space or design constraints force more complex geometry, two knife edge arrays can be combined in other orientations to achieve closely spaced parallel beams.

The knife edge mirrors serve to reduce the spacing of the individual beams, and clip the edges to minimize overlap and maximize coverage. Each beam may diverge slightly, and to different degrees along the long and short axis, so the mirror assembly is kept compact. The distance from the output of the mirror assembly to the imaging chip is kept as small as is practical.

Fixed Diode Array with Adjustable Mirrors

In another example embodiment, a 2-dimensional grid of light emitters (e.g. laser diodes) is fit into a fixed mount machined to tight manufacturing tolerances, with inset collimating lenses. Light beams emitted by the array of light emitters are directed at a two-stage array of knife-edge mirrors. In this embodiment the light emitters remain fixed and alignment is achieved by moving the mirrors. Once alignment has been achieved the mirrors may be permanently set, such that the output of the opto-mechanical system is a two-dimensional array of discrete, non-overlapping patches of light. This embodiment may otherwise be very similar or the same as the embodiment illustrated in FIGS. 1A and 1B.

This adjustment can be achieved by mounting each mirror on a pivot joint, which can be set with an adhesive once adjusted, or a flexible structure that can be shimmed into place.

In some embodiments knife edge mirrors are split into segments for each source, with individual tip-tilt control. This facilitates de-coupling individual sources from a row or column. Adjustable segments may be adjusted to apply any corrections to the direction or divergence of the individual beams.

Some embodiments provide adjustments to the positions and/or orientations of light emitters 102 as well as to the angles of mirrors 104.

Fibre-Couple Each Diode

Figure 2B:
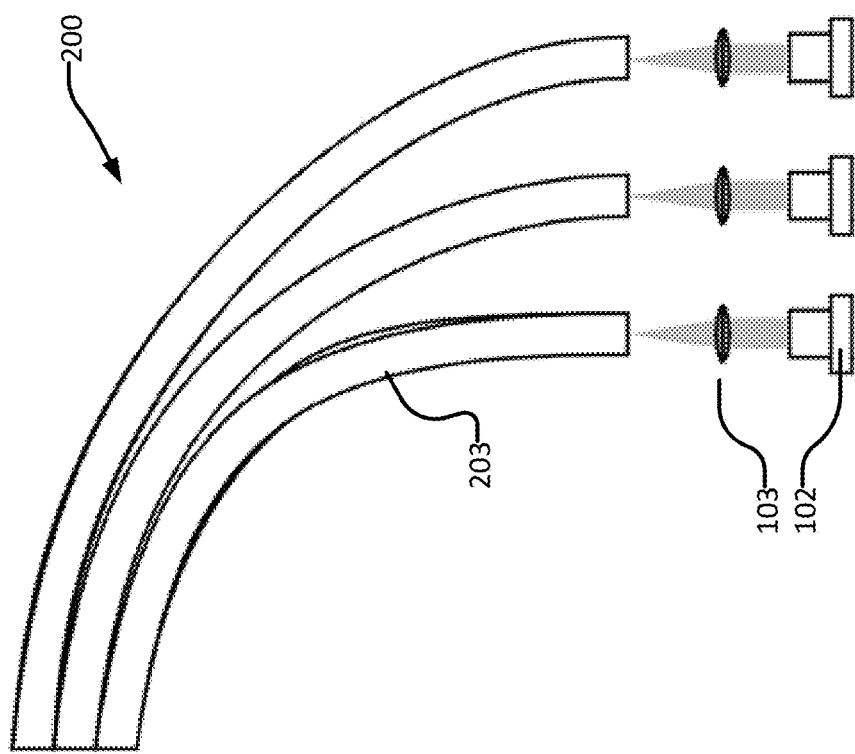
FIGS. 2A and 2B illustrate a light source comprising a fibre coupled diode array.
Figure 2A:
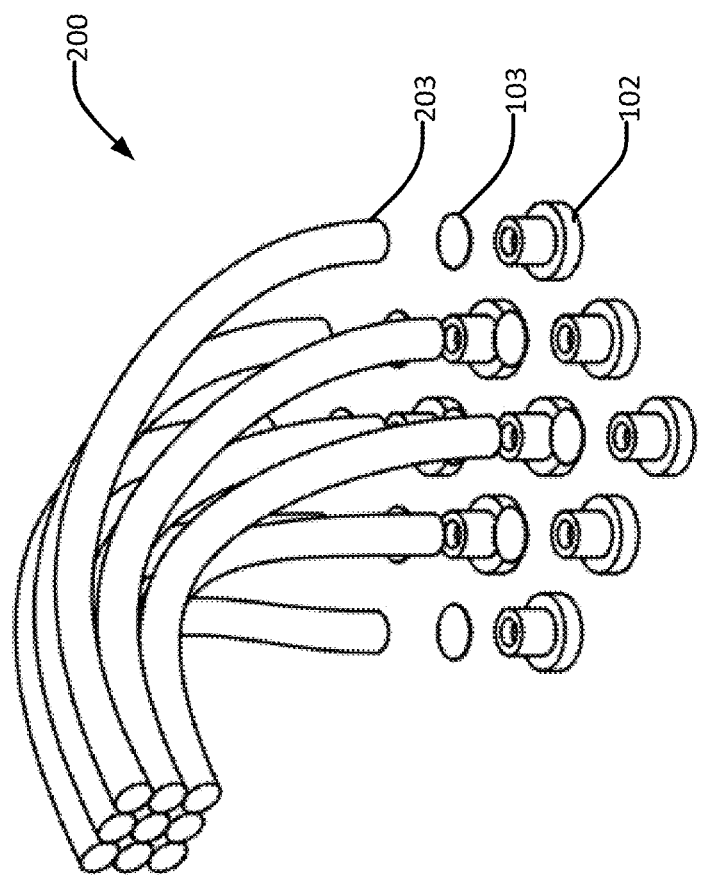

FIGS. 2A and 2B illustrate another embodiment wherein the outputs of laser diodes 102 or other light emitters are guided by optical fibers 203 to create a desired array of light patches. For example, the light patches may be arrayed on a surface of a dynamically-addressable focusing element such as a phase modulator (PMD). In this design an array of light emitters 102 each has an associated lens 103 that captures the emitted light, and couples it into a single-mode optical fiber 203. Fibers 203 are bundled, and the output of the bundle is relayed onto the imaging chip (e.g. a PMD). This approach can be used to transform a source array into any shape, spacing, or configuration. A single-mode fibre will maintain polarization and coherence of laser light, but this same approach can be implemented with multi-mode optical fibers, with optimal diameter and geometry for increasing coupling efficiency without significant losses in coherence or excessive divergence.

"Christmas Tree" Mirror Mount

Figure 3A:
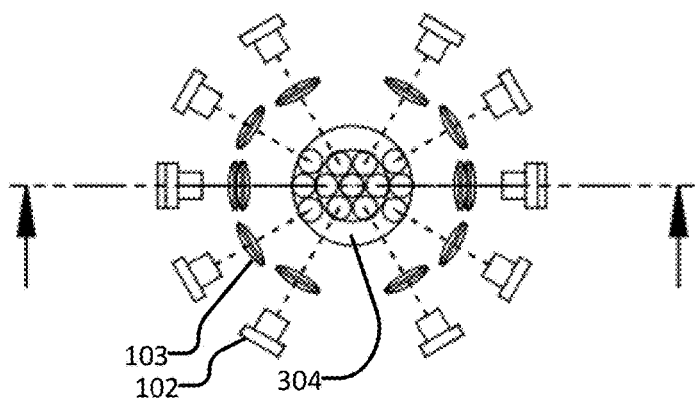
FIGS. 3A to 3C illustrates a light source comprising a "Christmas Tree" mirror.
Figure 3C:
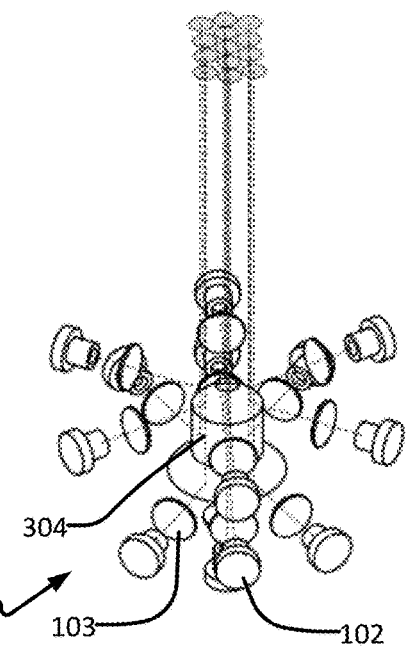
Figure 3B:
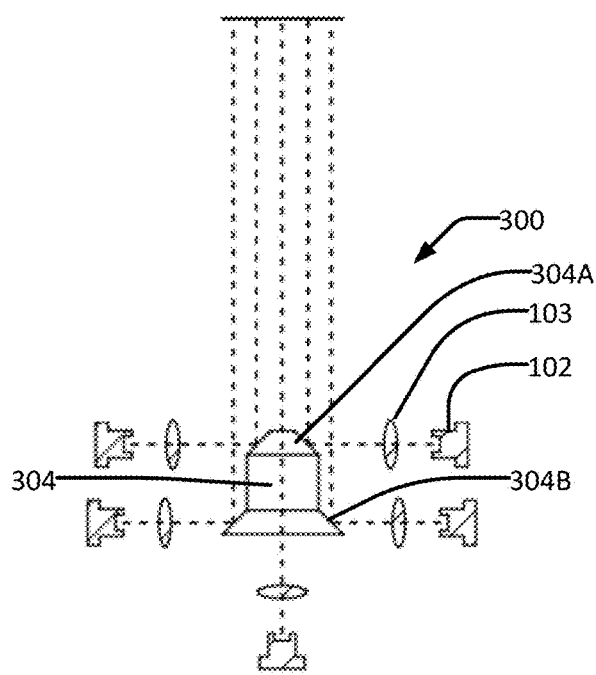

Instead of tiling patches in a rectangular pattern as shown, for example, in FIGS. 1A and 2A, a radial pattern of light patches can be achieved by using a mirror having a generally conical "Christmas tree" design. One potential configuration 300 is illustrated in FIGS. 3A to 3C. In this embodiment, light emitters 102 are mounted radially facing inward toward a Christmas tree mirror 304. In the illustrated embodiment, mirror 304 comprises a plurality of generally conical axially spaced-apart mirror surfaces 304A and 304B. The approach exemplified by FIGS. 3A to 3C can also be expanded, by machining lens curvature into the mirror surfaces 304A and 304B to collimate the beams, reduce the spacing, and aperture the beams in a single step.

A large source spacing may be used to improve alignment at the expense of the overall size of the opto-mechanical system.

If consistent polarization is required, angles may be taken into account to maintain consistent polarity in each beam as it hits the imaging chip or other destination.

Parabolic Mirror for Combining Radial Beams

Figure 3D:
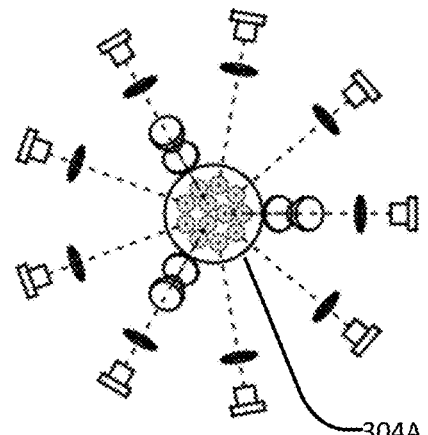
FIGS. 3D to 3F illustrates a light source comprising a parabolic mirror.
Figure 3E:
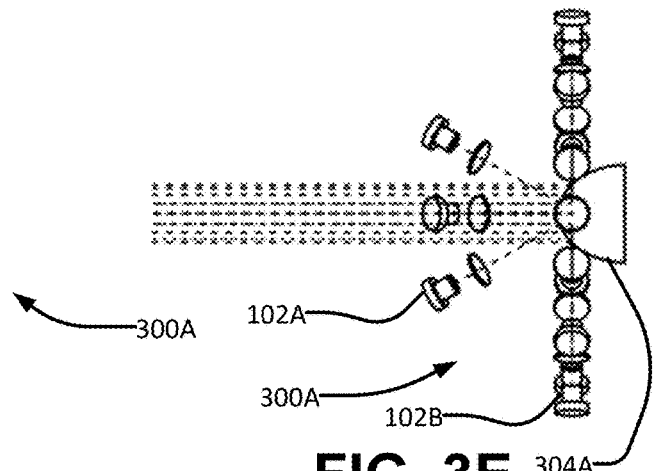
Figure 3F:
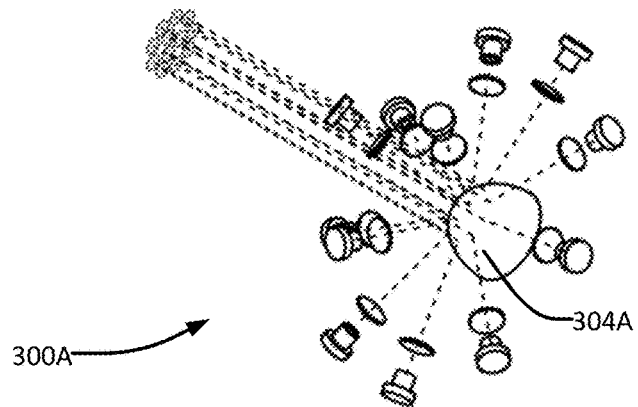

FIGS. 3D, 3E and 3F show an arrangement 300A which is similar to arrangement 300 but uses a parabolic lens 304A to deflect beams from a radial arrangement of light emitters 102A, 102B into a parallel, closely spaced arrangement. In the illustrated embodiment, the emitters include light emitters 102A which direct beams at mirror 304A at a first angle to the axis of symmetry of mirror 304A and light emitters 102B which direct light beams at mirror 304A at a second angle to the axis of symmetry of mirror 304. This concept is similar to the "Christmas Tree" approach illustrated in FIGS. 3A to 3C, but without the aperturing effect of mirror edges.

De-Magnification of Over-Sized Beam Grid

The target illumination area, such as an imaging chip, SLM, or PMD, may be small compared to an array of sources. Any of the above approaches, including the knife-edge mirror approach described with reference to FIGS. 1A and 1B can be used to create a tiled pattern of non-overlapping patches of light (i.e. an array of parallel light beams) on a scale that is larger than the target area. In some embodiments, the scale of the patches of light is a factor of 2 or more times larger than the target area (e.g. the patches of light cover an area 4 or more times that of the target area in some embodiments). An optical system can be used to reduce the area of the resulting cluster of beams by demagnifying the light beams such that the array of patches of light is adjusted to the size required.

An example arrangement 400 is shown in FIGS. 4A and 4B. An optical system 401 (for example any of the systems described above) creates an array of beams 402. An optical system 404, in this example comprising lenses 404A and 404B de magnifies the array of beams.

Gaps may be maintained between the parallel beams, so divergence or distortion in the de-magnified light profile may be avoided.

Cascading Knife-Edge Mirror Stages

In some embodiments Individual modules each comprising a plurality of light emitters as described above can be produced in configurations which each yield an array of light patches (for example a 3×3 or 3×2 configuration). Beams output by two or more of such modules may be de-magnified as illustrated in FIGS. 4A and 4B, and tiled using an adjustable mirror technique, as described above (e.g. using arrays of tiltable mirrors arranged as shown in FIG. 1A).

FIG. 5 illustrates an example system 500 in which light output by three modules 401 is deflected by mirrors 502 to form an array 503 of patches of light. Light from any suitable number of modules 401 may be combined in this manner. Array 503 may combine arrays from modules 401 in a linear manner, as shown, or may combine arrays from modules 401 to yield an output array 503 that is larger in each of two dimensions than the arrays of patches of light from individual modules 401. For example, the arrays of patches of light from modules 401 may be arranged to make a composite array having plural rows and columns of arrays from individual modules 401.

Light Emitters

Any of a wide variety of light emitters may be used in the embodiments described above. for example, the light emitters may comprise lasers. Solid state lasers such as laser diodes are practical for a range of applications. Other examples of light emitters include solid-state light emitters such as light emitting diodes (LEDs); plasma light emitters; cold cathode light emitters; lamps; etc. In some embodiments the light emitters emit coherent light. In some embodiments the light emitters emit polarized light.

Light emitters may be provided in the form of discrete devices or may be packaged together in packages combining plural light emitters. For example, light emitters in embodiments as described above may be provided using systems comprising multiple light emitters, such as diode bars, with appropriate emitter count and spacing. Such embodiments may be advantageous for reducing the number of separately-mounted components in a light source.

Some light emitters may emit light in a form which is advantageously corrected to yield a beam with desired properties (e.g. a beam that is well collimated and directed in a desired direction). Custom optics may be provided for beam conditioning and correction for beam path in some embodiments.

Figure 6:
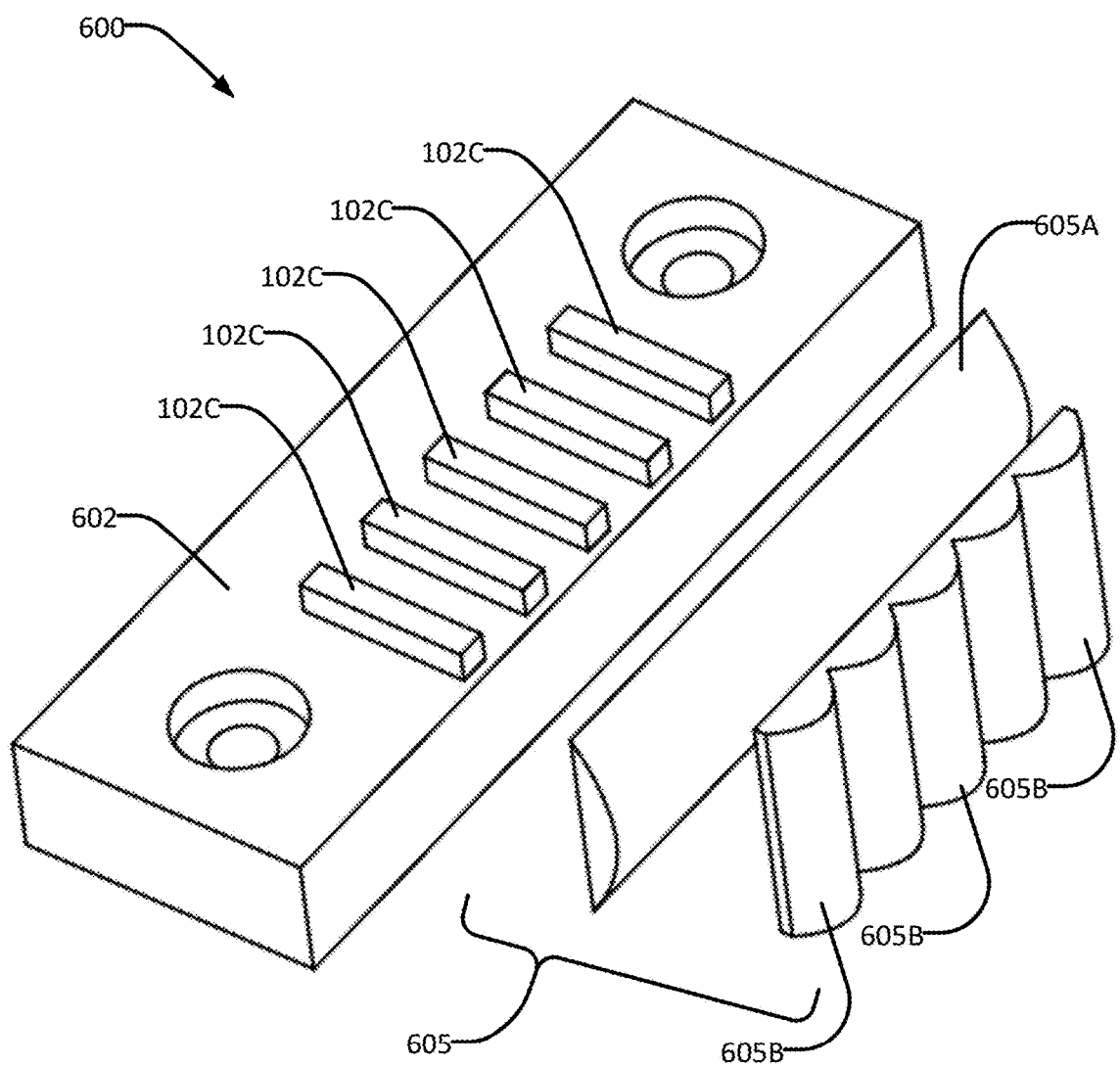
FIG. 6 illustrates an example optical arrangement for collimating light beams from light emitters having a fast and a slow axis.

FIG. 6 shows an example apparatus 600 comprising an edge-emitting diode array 602 which provides a plurality of individual light emitters 102C. Each light emitter 102C has a fast and slow axis. Apparatus 600 includes collimating optics 605 which includes a lens 605A for collimating in one axis and a plurality of lenses 605B for collimating in a second axis to yield a line of collimated output light beams. Two or more sets of apparatus 600 may be stacked to provide a two dimensional array of emitters.

Especially where an off-the-shelf diode bar is used for array 602, some conditioning and "smile correction" may be provided in the optical system in the case that the line of emitters has some curvature. An aperture, or reverse knife edging may be provided to increase the separation between beams. This can facilitate substantial elimination of overlap between adjacent beams.

Dealing with Path Length and Divergence

Most light emitters do not emit perfectly collimated beams of light. A beam of light from a light emitter will generally exhibit some divergence. It is desirable to reduce the effect of such divergence. In cases where divergence of the beams from different emitters can be substantially eliminated, an output array of patches of light may have the patches spaced very close to one another without any significant overlap between the patches. Some light emitters emit light that diverges differently in different directions. A direction in which the divergence is large may be called the fast axis. A direction in which divergence is smaller may be called a slow axis. Where a light emitter has a fast and a slow axis, a single symmetrical lens can approximately collimate a beam from the light emitter along the fast or slow axis, but the beam will continue to diverge in the other axis.

Pairs of Mirrors to Fix Path Length

Some embodiments equalize path length from the light emitters to the corresponding patches at the target area. Making path lengths equal for all beams is advantageous at least in part because beam divergence can differ for different path lengths. Where the path lengths are equal, divergence of all of the beams may be approximately equal.

Figure 7:
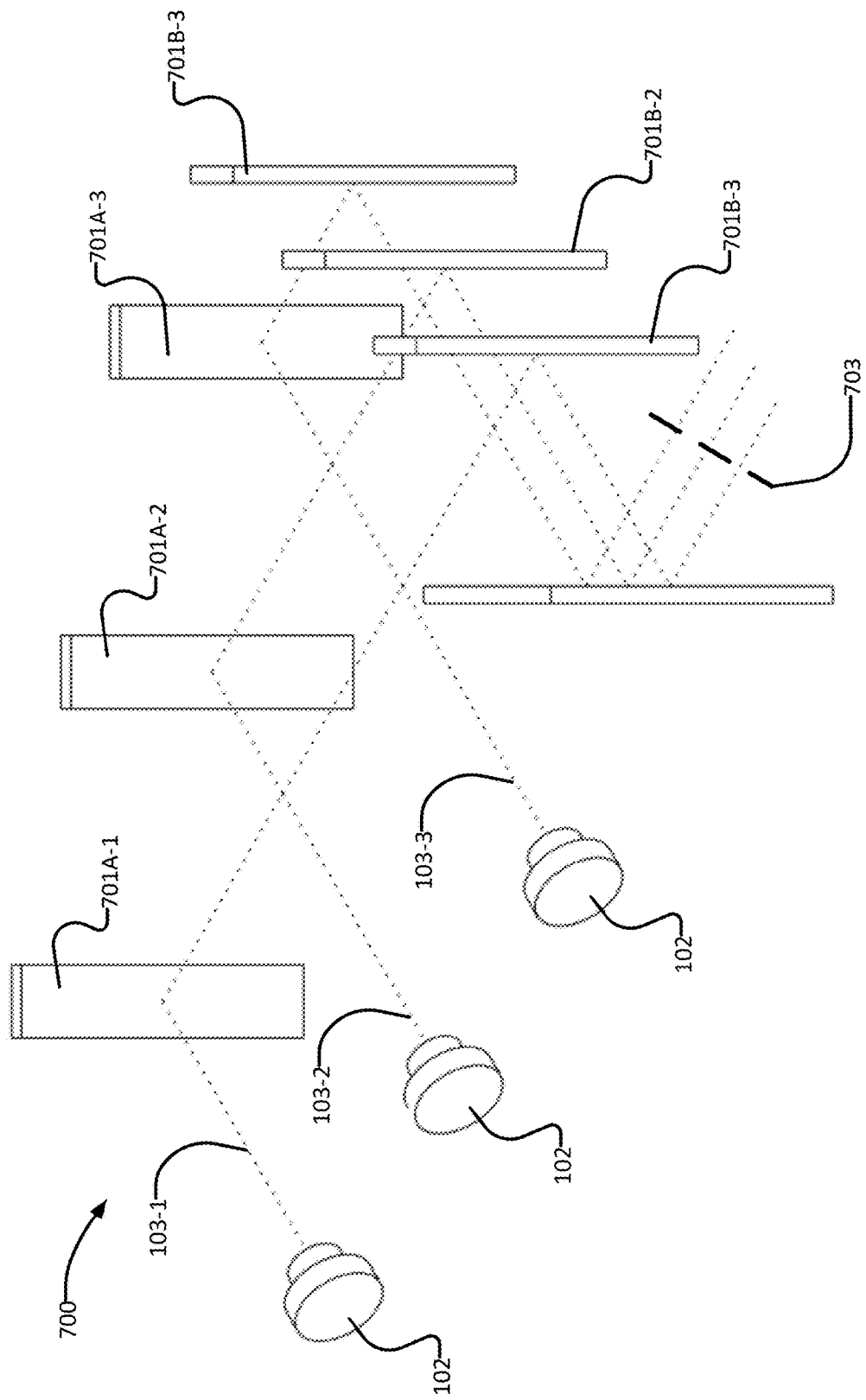
FIG. 7 illustrates path length equalization with multiple mirrors.

Mirrors can be used to fold the light path to equalize the path length across all beams, as shown in apparatus 700 of FIG. 7. Using multiple mirror stages, the path length for each beam can be identical without complex geometry. Apparatus 7 includes light emitters 102 that emit light beams 103-1, 103-2 and 103-3. Each beam interacts with a pair of mirrors that fold its path. the mirrors are spaced so that the path lengths from each light emitter 102 to output beams 703 are equal. Apparatus 700 includes mirror pair 701A-1 and 701B-1 which acts on beam 103-1; mirror pair 701A-2 and 701B-2 which acts on beam 103-2; and mirror pair 701A-3 and 701B-3 which acts on beam 103-3.

Asymmetrical Lenses

Light profiles of source light beams may not be radially symmetrical, either in terms of shape, or rate of divergence. For example, the fast and slow axis of a laser diode have different rates of divergence. This can be corrected by introducing a lens that is not circularly symmetrical in the beam direction (e.g. a cylindrical lens) in the light path.

Some embodiments provide an array of cylindrical lenses to correct the divergence along the slow axis of beams from a plurality of light emitters such as laser diodes. This approach is well-suited for the case where diode bars or a diode bar stack provide the light emitters. This approach may also be applied to an array of discrete diodes or other light emitters. An example is illustrated in FIG. 6.

Various possible optical arrangements to correct divergence of beams having a fast and a slow axis include using pairs of cylindrical lenses for each axis, using a single shared spherical lens and a cylindrical lens for each axis and so on.

Long Geometry

As described above, the effects of divergence can be mitigated by designing the source array such that distance from the source array to the mirrors which guide the light into parallel beams (e.g. knife edge mirrors as shown in FIG. 1A) is large, relative to the distance between the knife-edge mirrors and the target area (e.g. a dynamically addressable focusing element or other imaging chip). In some embodiments the distance from the light emitters to the mirrors is at least 3, 5, 10 or 18 times larger than the distance from the mirrors to the imaging chip.

With this approach, increasing the distance from the light emitters to the mirrors makes any relative differences in path lengths for different beams smaller. The mirrors may be close enough to the imaging chip that the amount of divergence between the mirrors and the imaging chip is small, such that no undesirable overlap occurs at the imaging chip.

Desired Light Source Characteristics for Freespace Laser Projector Using Phase and Amplitude Modulation In a traditional digital projector, it is important that the amplitude SLM (DLP, LCD, LCoS) which is imaged onto the projection screen via the projection lens is illuminated uniformly.

In some embodiments a light source illuminates a dynamically-addressable focusing element non-uniformly. In such embodiments dynamically-addressable focusing element (e.g. a phase modulator) may be controlled to provide structured illumination (which varies from location to location in a known way) on an amplitude SLM. While it remains beneficial to illuminate the phase modulator uniformly (even heat dissipation, uniform light profile on SLM when a flat phase is addressed or in case the phase SLM fails), intensity variation across the phase SLM can be accounted for and the lensing pattern can be adjusted to 'correct' for it (for example to provide uniform illumination on the amplitude SLM when desired).

Alignment Example

A light source for a particular application desirably achieves specifications required by the application for beam quality and stability in a package that is simple and compact. Ideally the light source may be installed as a single module which can be aligned at time of manufacture using adjustments that facilitate rapid accurate alignment (e.g. orthogonal adjustments such that adjustment of one beam property does not change other beam properties).

In some embodiments alignment is performed in a 'bottom-up' approach in which light beams from individual light emitters are centered and collimated, the light emitters are assembled into banks, the alignment of the beams is adjusted, and then beam shrinking optics are adjusted to deliver the output light to a desired target area (in some embodiments the target area is a few mm per side, for example 12×7 mm). After each alignment step the adjustment may be fixed using a settable material such as a suitable epoxy, glue, solder or the like.

Table I provides three sets of example design specifications. Some of these specifications are achieved in some embodiments. One or more of these sets of specifications are achieved in some embodiments.

TABLE I

Example Design Specifications

| Priority | Feature | Good specs | Better specs | Best specs | Unit | Comments/Metrics |
|---|---|---|---|---|---|---|
| 1 | Z-Parallelism | 500 | 210 | 0.5 | arc sec | Fast axis, measure on optical axis at .1 m, .5 m and 5 m distance 6.4 um resolution, 300 mm away |
| 2 | XY Parallelism (in-plane tilt) | 15 | 2 | 0.5 | Degrees | |
| 3 | XY-Shifting (tiling) | 50 | 10 | 0.1 | px (LETO) | |
| 4 | Divergence (fast axis) | | | | mrad | |
| | Divergence (slow axis) | | | | mrad | |
| 5 | Fill-factor on LETO | 40 | 95 | 99 | % LETO area | Fill factor is a function of beam size and diode count. Need to modify one or the other |
| 6 | Intensity uniformity on LETO | 40 | 75 | 95 | % relative to peak | |
| 7 | Measurement port | absent | Present, removable | absent | | |
| 8 | Beam stability over time | unknown | quantified | constrained | % variation | Meet 1, 2, 3 after 1 h, 6 h, 24 h |
| 9 | Beam stability over temperature | unknown | quantified | constrained | % variation | Meet 1, 2, 3 at 20 C., 40 C., 60 C. |
| 10 | Beam stability over power | unknown | quantified | constrained | % variation | (Profile, Centre Location, Intensity) Consistency & predictability over various modulation approaches, PWM, current control, etc. |
| 11 | Throughput | 60 | 75 | 90 | % | |

Example Light Source Block

In this example, eight laser diodes, each with a corresponding collimating lens, are positioned in an array, with 10 mm separation distance. Each diode is pressed into a copper block with integrated cooling fins, and attachment features. Eight lenses are mounted in a fixed block with 10 mm spacing. A jig holds the fixed lens array stationary relative to an alignment pattern some arbitrarily large distance away, in the far field. This alignment pattern includes reference lines indicating desired beam positions, with 10 mm spacing.

A single diode block is held in a three-, four-, five-, or six-axis positioning stage, and positioned such that the emitter is centered with respect to the corresponding lens, the output beam is collimated (neither diverging or converging in the far-field), oriented so that the polarization is consistent with the light source specification, and directed such that the beam is coincident with the corresponding position indicated on the alignment pattern.

The z-axis position of the diode emitter (parallel to the beam direction) controls the divergence of the beam. The x- and y-axis position of the diode emitter control the x- and y-location of the laser spot on the alignment pattern. Rotation about the z-axis controls the polarization orientation. The x- and y-axis position of the diode emitter can be adjusted to correct for distortions in the beam shape.

When the diode is suitably positioned, it is fixed to the lens block. This mechanical connection can be achieved in a number of ways such as:

1. The diode block has tabs that are soldered to pads on the lens block
2. The diode block remains in the jig, and an adhesive such as epoxy or a suitable UV-curing adhesive or a suitable thermal curing adhesive is applied to fix the diode position,
3. The diode block is spot welded to lens block,
4. The diode block is initially aligned coarsely and is precisely deformed in the jig for fine alignment.

Techniques for Improving Alignment Precision

With a printed alignment mask on the example system described, collimation and parallelism accuracy is limited to on the order of +/−1 mm at a distance of 3 m, or 0.015 degrees.

For improved accuracy, more advanced techniques can be implemented. Some examples are:
1. A diffraction grating can be positioned in the light path, to produce larger alignment patterns with diffractive imaging, and magnified for increased measurement accuracy.
   The collimation can be adjusted to achieve the optimal point spread function to a much higher precision.
   The parallel beam alignment precision can be improved by registering two alignment patterns rather than attempting to centre an amorphous beam dot on an alignment grid visually.
2. A dynamic diffractive optical element, such as a phase-only Spatial Light Modulator, can also be used to improve alignment precision, by dynamically changing the diffractive alignment pattern for a multi-step alignment approach.

Sets of alignment patterns can be generated, starting with coarse patterns, and moving to progressively finer alignment.

Different patterns may be better suited to achieving different aspects of alignment. For example, horizontal lines for XZ-plane alignment, vertical lines for YZ-plane alignment, a suitable horizontally and vertically symmetrical pattern for collimation adjustment, or for optimizing the beam angle about the optical axis etc.

Automation of Light Source Alignment

The alignment process can be automated, diode-by-diode, using computer-controlled 4-, 5-, or 6-axis alignment stages, and either a machine vision camera directed at a screen, or by relaying the output beams onto an optical sensor, such as a CCD, or CMOS. The following is an example algorithm that may be applied for automated or semi-automated alignment. The algorithm begins with a fixed block of lenses, mounted to an alignment jig. For the duration of the alignment procedure, the lens array may remain fixed relative to the all other elements, excluding the diodes. The alignment jig holds the lens array block, pointed at a dynamic diffractive optical element (e.g. a phase modulator). Light output from the phase modulator is resized using standard optics, and relayed onto an optical sensor, or projected onto a screen and captured by a machine vision camera. The diffractive optical element and screen or optical sensor are placed at a distance that is very large compared to the focal length of the lenses in the fixed array.

1. Begin
2. Position the light emitter (e.g. a laser diode) in approximate alignment with the corresponding lens and clamp the laser emitter in a jig, providing 4-, 5-, or 6-axis micro-positioning. The jig may comprise a stage, and a holding device.
3. Proceed with the automated alignment procedure:
    a. Apply a flat phase pattern to the dynamic diffractive optical element, and adjust the focus by moving the light emitter so that the beam neither converges nor diverges. This can be achieved by sampling the beam profile at several distances along the optical axis and adjusting the distance between the laser diode and the lens until all samples are the same width. This can also be achieved using a beam splitter and a phase sensor, and adjusting the position of the laser emitter until the beam profile is maximally flat.
    b. Insert a polarizer into the light path (if the dynamic diffractive optical element is not polarized, or if it is not polarized in the desired direction). Adjust the angle of the light emitter about the optical axis, holding all other adjustments constant, until the beam reaches maximum brightness.
    c. Apply alignment patterns to the dynamic diffractive element and adjust the position of the light emitter position until the patterns are registered optimally. This process can be repeated for various aspects of alignment, including XZ-plane parallelism, YZ-plane parallelism, rotations about the X or Y axes.
    d. This alignment procedure can be repeated in multiple steps, from coarse to fine alignment
4. When sufficiently precise alignment is achieved for the light emitter-lens pair, fix the light emitter to the lens block using one of the methods described above.
5. Repeat the above steps for each additional light emitter adjusting for beam characteristics as above and also ensuring that the beam is parallel to the beams of previously-aligned light emitters added to the block.

Combined System

Once a block of light-emitter-lens pairs has been aligned to yield collimated, parallel beams, with identical polarization orientation the block may be combined with other elements which function to create a more compact beam array, and to shape and resize the combined light profile to cover an imaging chip. Such a system might comprise:

- a mount to hold the array of diode-lens pairs;
- an array of knife-edged mirrors arranged to decrease the spacing between adjacent beams;
- one or more lenses or mirrors for expanding or contracting the beam to suit the desired application;
- mirrors for folding the light path to achieve a compact footprint and/or to equalize path lengths or different beams;
- cooling for the heat-generating elements (e.g. suitable heat sinks and/or active coolers such as Peltier elements); and
- control electronics for the light emitters.

Some embodiments also include monitoring sensors such as temperature sensors attached to measure operating temperatures of the light emitters and/or other elements and/or measurement ports at which beam profiles may be evaluated.

In an example embodiment the light emitters comprise 500 mW lase diodes such as the model ML501P73 laser diodes available from Mitsubishi electric. these laser diodes output light at 638 nm. An example display includes 6 to 20 such laser diodes.

Control Electronics

It is not always desired to have light emitters running at full brightness at all times due to the fact that some images do not contain much light. It is possible to steer unneeded light into a dump area (e.g. through suitable control of a dynamically-addressable focusing element), but it would be more ideal to reduce the light output of the light emitters and reduce energy consumption and heat output. Reducing the output of the light emitters for darker images may also improve black level by reducing scattered light.

Laser diodes can be dimmed by reducing the amount of current passing through them and or turning them off and on at a sufficiently rapid speed to not be noticeable by a human observer—known as pulse width modulation (PWM). It is more difficult to achieve precise intensity control by controlling the current than by PWM.

When using PWM control a duty cycle (% of the time that a light emitter is ON) can be thought of as controlling the output light intensity. For example one way to implement 8 bit control over light intensity is to clock a counter at 256× the PWM frequency such that an output is held in a state corresponding to the light emitter being ON until the counter value reaches the 8 bit intensity value. The output would be in a state corresponding to the light emitter being OFF at other times during each PWM cycle.

In some projectors Digital Light Processing (DLP) devices are used to create the final image. It is desirable to provide a light source as described herein which is compatible with downstream DLP devices. In a DLP device a binary modulator flips a micro mirror back and forth between an "on" state where it sends light to the screen and an "off" state where it sends light to a "dump" area. Each pixel has a corresponding micro mirror. The DLP creates greyscale by flipping the micro-mirror back and forth rapidly. The micro mirror is controlled to spend more time in the "on" state to make a brighter pixel or more time in the "off" state to make the pixel dimmer.

In an example DLP driving scheme, each pixel has an 8 bit (or more) greyscale drive value per frame of video (usually 60 fps), these are translated into 8 mirror flip periods, with one period for each bit. The period corresponding to the least significant bit is short. The period doubles for each bit and is longest for the most significant bit.

Figure 8:
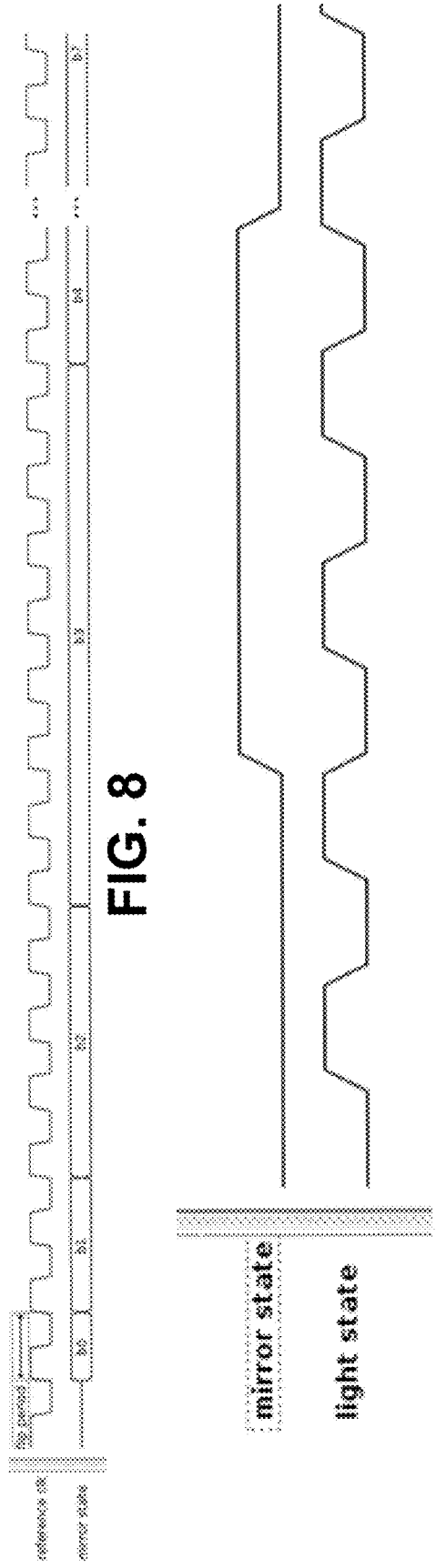
FIG. 8 illustrates a DMD control scheme.

Whether a bit is set to 0 or a 1 determines whether the mirror is flipped to the "on" or the "off" position for the corresponding period. FIG. 8 shows that the shortest period that the mirror may be in the "on" or "off" state is for the lowest-order bit (b0). This shortest period may be called the "flip period".

Asynchronous Light Pulses

If a pulsed light source is used (for example to produce light at 50% of the maximum level), flickering will occur if the "off" and "on" pulses of the light emitter are asynchronous to the mirror flipping and the periods of "off" and "on" significantly differ from frame to frame on a static image due to a low pulse frequency for the light state.

Slow Asynchronous Light Pulses

Figure 9A:
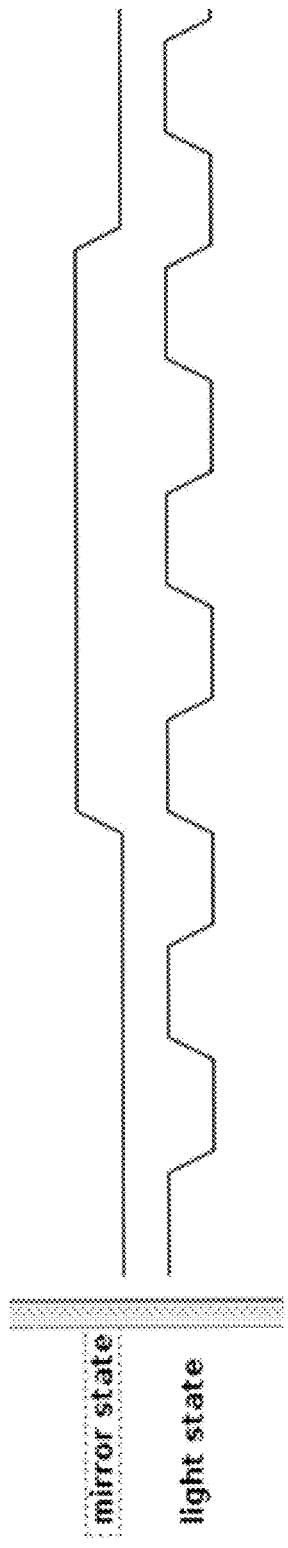
FIGS. 9A and 9B illustrate a possible effect of asynchronous modulation of a light source and operation of a DMD.
Figure 9B:

This is illustrated in FIGS. 9A and 9B. In frame 1 of FIG. 9A the viewer perceives two light pulses during the time the DMD transmits light. In frame 2 of FIG. 9B the viewer perceives three light pulses during the same DMD open period. This 50% change in light intensity is due to the light pulses being asynchronous to the mirror flips.

Fast Asynchronous Light Pulses

If the "off" and "on" light source periods are short relative to the "mirror flip" period, the difference between "off" and "on" periods between static frames should be drastically reduced and be imperceptible to the human eye. For example, FIGS. 10A and 10B show an example in which the light emitter is modulated significantly faster than the DLP flip period.

Figure 10A:
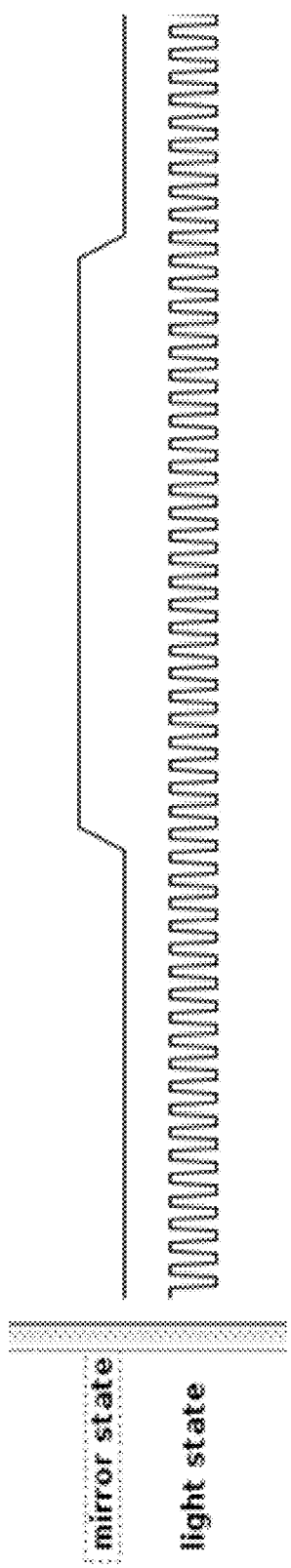
FIG. 10A and 10B illustrate asynchronous modulation of a light source and operation of a DMD in a case where the light source is modulated at a high frequency relative to flip time of the DMD.
Figure 10B:
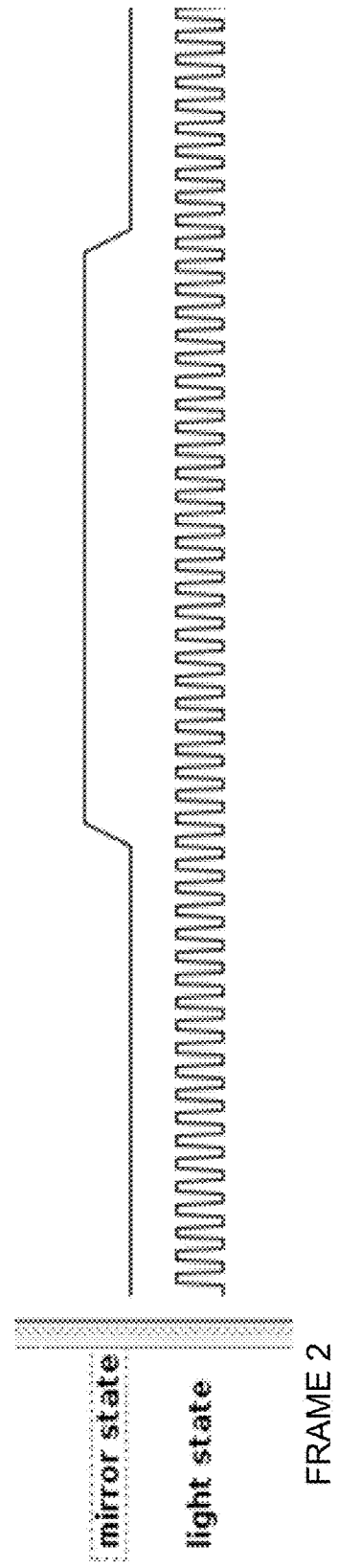

In FIGS. 10A and 10B only a single minimum width mirror flip is shown depicting a drive value of 1. The viewer perceives a light intensity corresponding to 27/54 in FIG. 10A and to 28/54 in FIG. 10B. A disadvantage of this solution is that a large amount of electromagnetic interference (EMI) can be produced by switching powerful lasers off and on very quickly. Also, tighter timing tolerances are required by the circuitry to minimize duty cycle distortion between lasers.

Synchronous Light Pulses

Figure 11:
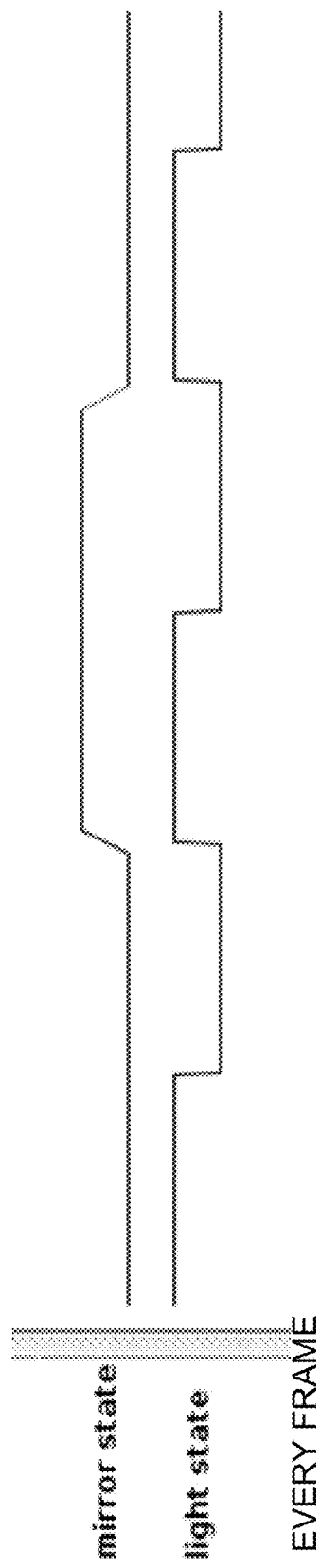
FIG. 11 illustrates synchronous modulation of a light source and operation of a DMD.

If the light emitter "off" and "on" periods are synchronous to mirror flips, there should be practically no difference between static frames and the light source pulse generator need only run at the period of the mirror flips, drastically reducing generated EMI and allowing for slacker timing considerations. FIG. 11 illustrates an example embodiment in which light output from a light emitter is synchronized to DLP flip cycles.

When a new frame arrives, the mirror flip logic for all pixels can be updated simultaneously via a double buffering scheme (or in blocks from top to bottom if desired).

Synchronizing the Light Source to the DLP

Some DLP driver chips provide a "trigger out" pin that indicates the start of a mirror flip cycle. In absence of this an independent "mirror timing recovery" circuit can be constructed. When the mirror is in the "off" state it sends light to a "dump" area. Placing a photoreceptor in the dump area will send a voltage back to the circuit when a mirror flips to the "off" state. During a "training mode" the lasers are constantly on and the DLP sends only the least significant bit to the dump area (i.e. drive level 254 for a DLP with 8 bit control). Using a high speed reference clock and counters the period of the shortest mirror flip can be determined and the timing of subsequent mirror flips can be predicted. Similar methods are employed in telecom applications for clock and data recovery from a single wire serial data stream. A jitter attenuator may be provided depending on the amount of error in the recovery system.

With the recovered mirror flip period, the light source can synchronize PWM for the light emitters to the mirror flip periods such that a deterministic light intensity can be produced for the shortest mirror flip period (and all longer periods). During longer mirror flip periods the PWM cycle could simply repeat (twice for bit 1, four times for bit 2, 8 times for bit 3 etc.), or to further reduce EMI the PWM cycle period could lengthen for each bit.

Figure 12:
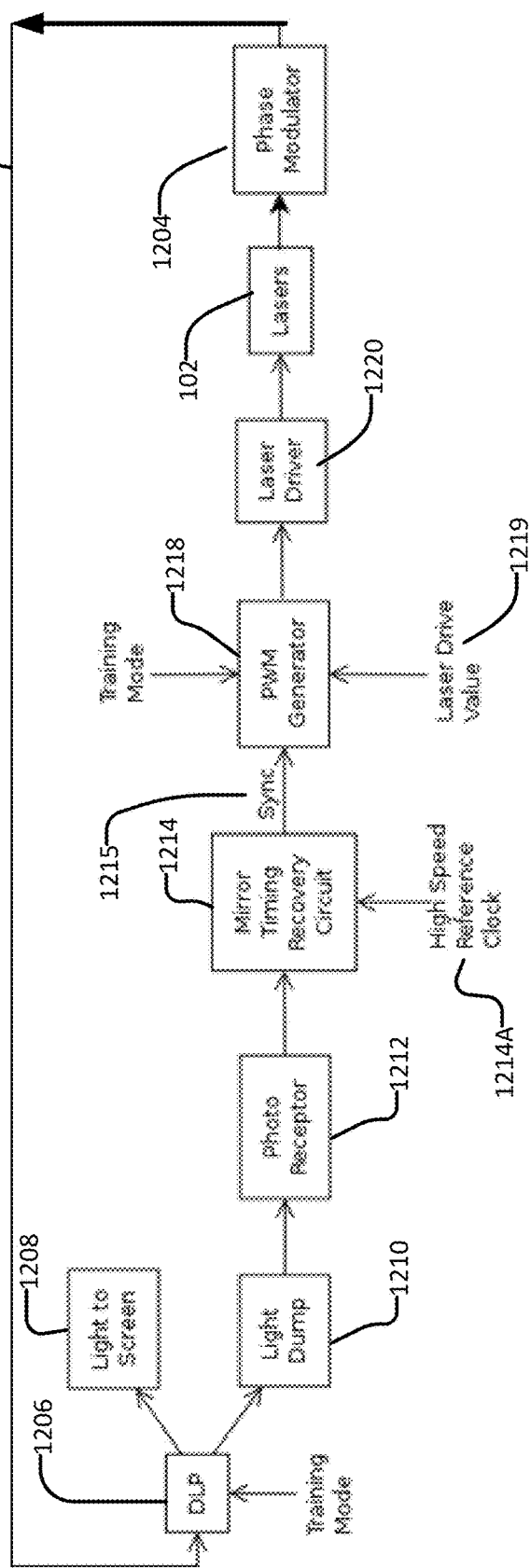
FIG. 12 is a block diagram of example apparatus for generating a DMD sync signal by analyzing light dumped by the DMD.

FIG. 12 illustrates an example system 1200 in which a light source 102 illuminates a PMD 1204 by way of an optical system (which may, for example, be as described in any embodiment discussed herein), Light 1205 is steered by PMD 1204 to illuminate an active area of a DMD (or DLP) 1206. Pixels of DMD 1206 are operable to direct light to a screen 1208 or a light dump 1210. A photo receptor 1212 measures the light incident at light dump 1210. Since this light is turned on and off at the times that micromirrors of the DMD 1206 flip, the output signal of photoreceptor 1212 is modulated. The output signal of photoreceptor 1212 is provided to a timing recovery circuit 1214 which also receives a reference clock signal 1214A. Timing recovery circuit determines the timing of the DMD mirror flip cycle through analysis of the signal from photoreceptor 1212 and generates a sync signal 1215 which is provided to PWM generator 1218. PWM generator 1218 receives light emitter drive values 1219 and generates PWM signals to cause light emitter driver 1220 to drive light sources 102 at appropriate levels. PWM generator 1218 synchronizes the PWM signals to sync signal 1215.

A further enhancement that may be added to reduce the maximum current draw from the laser power supply and somewhat reduce EMI is to shorten the PWM period slightly and stagger the turn on times for different light emitters.

Figure 13:
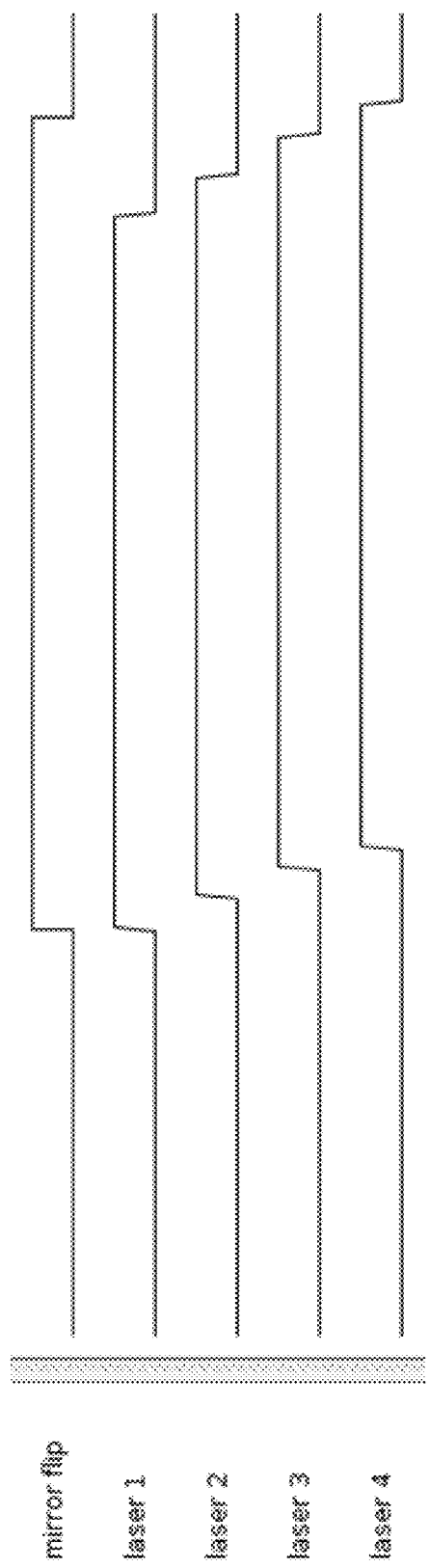
FIG. 13 illustrates an example staggered start of light emitters relative to a DMD cycle.

Staggering the laser turn on times requires less maximum current capacity from the laser power supply because only one laser turns on at any given time. This should also reduce EMI produced by the power supply. FIG. 13 illustrates staggered laser turn on times synchronized to a DMD mirror flip.

Light Emitter Temperature Control

The temperature of a laser diode affects the wavelength produced and the efficiency (lumens per watt). If laser output is attenuated to a low level for an extended period the laser may cool excessively and lumens output may deteriorate. Worse, the light output may become non-deterministic relative to the PWM drive level. To correct for this condition, the light source may be configured to drive the lasers harder when they are cool and to steer the excess light to a dump area to warm the lasers up. Alternatively, a Peltier element (and or another heater) can be used to warm or cool a laser that is operating outside of a desired temperature range. An optical feedback path can be implemented to detect light intensity in part of the beam to measure accuracy of lumens output in relation to laser drive levels and temperature.

Example Applications

Embodiments of this invention can be used to provide illumination for any of the applications or markets described above. A light profile made up of tiled, substantially non-overlapping patches of coherent, polarized laser light has multiple potential applications. An example application is providing illumination for creating a light field using a phase modulating device (PMD). Outputs of the lasers may be individually modulated if desired. In some embodiments, polarizations of the light patches is oriented to match a polarization preferentially passed by the PMD.

Example phase modulation devices include:
Spatial light modulators (SLM), for example a 1D or 2D array of pixels, in which the drive level addressed at a pixel correlates to the phase delay applied to the light impinging on that pixel, for example the drive levels between 0 and 65535 may correspond to the range of phase delay between 0 and 2 π radians (one cycle of the wavelength of the light).
Such a spatial modulator can simultaneously change the state of polarization of the light (an example is a transmissive liquid-crystal display, or a reflective liquid crystal-on-Silicon display (LCoS)). Alternatively, such an SLM can be designed to affect the phase delay of that pixel, but not its polarization.
An acousto-optical modulator (AOM; also called a Bragg cell) can affect deflection angle of the incoming light, its phase, frequency and polarization characteristics.
A grating light valve (GLV); currently, these devices are 1D addressable arrays where each pixel or element can vary the phase of the impinging light by mechanically varying the path length.
Deformable Mirrors; using either continuously deformable mirror surface with an array of control points, or arrays of discrete, individually modulated reflective pixels.

A phase modulation device can be used to create a desired light field. A lens in the classical sense is a variable thickness piece of transparent material such as glass that retards the phase of the incident light differently across the lens surface, resulting in a focused or de-focused spot of light depending on the curvature or shape of the lens. A similar effect can be achieved by retarding the phase of the incoming light beam using a phase modulating device (PMD). For example, the effect of a lens can be achieved by addressing a varying phase pattern on the PMD, with for example 2 π phase retardation in the centre of the PMD, falling off to 0 phase retardation on the edges of the PMD. Stronger lenses (lenses with a shorter focal distance) can be achieved by controlling the PMD to provide phase modulation in a pattern like that of a Fresnel-lens (i.e. by phase wrapping the values applied to drive the PMD pixels).

A PMD may be controlled to simulate the effects of other optical elements, such as prisms and gratings in a similar fashion, for example by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

Several lenses side-by-side or super-imposed on the PMD can coarsely approximate an image. By suitably controlling a PMD to emulate the action of a number of lenses one can create a situation where an image or parts of an image are in focus anywhere along the direction of light propagation, for example in several planes.

A PMD may be controlled to create any of an exceedingly broad range of output light fields. Determining what data to use to drive the PMD to yield a specific desired output light field may be done in a number of ways. In a more-computationally expensive but more exact mode one can apply a mathematical model of the inverse transformation provided by the entire optical system (including the PMD) to start with the desired output light field and calculate the PMD pixel settings corresponding to the desired output light field. A less-computationally intensive but less exact mode includes setting parameters for one or more discrete optical elements (lenses, prisms, etc.) that can be emulated by the PMD to yield an output light pattern that approximates the target light pattern. The parameters may, for example, include sizes, locations and optical strength.

Various approaches to controlling a PMD to cause a desired image or other light pattern to be displayed are described in PCTCA2014051013 published as WO2015054797; PCTCA2015000324; PCTCA2015050515; and PCTCA2015050730; the disclosures of all of which are hereby incorporated herein by reference for all purposes.

Hybrid GS-Based Imaging:

In an example embodiment, an adaptation of the Gerchberg-Saxton algorithm is used to generate a pattern on a PMD to produce an image in the far field. The Gerchberg-Saxton algorithm is an iterative approach to retrieving the phase of a pair of light fields. Given some target illumination profile, and a well-characterized input light profile, an iterative approach can be used to converge on a phase pattern that, when applied to the PMD, will approximate the target profile in the far field.

Figure 14A:
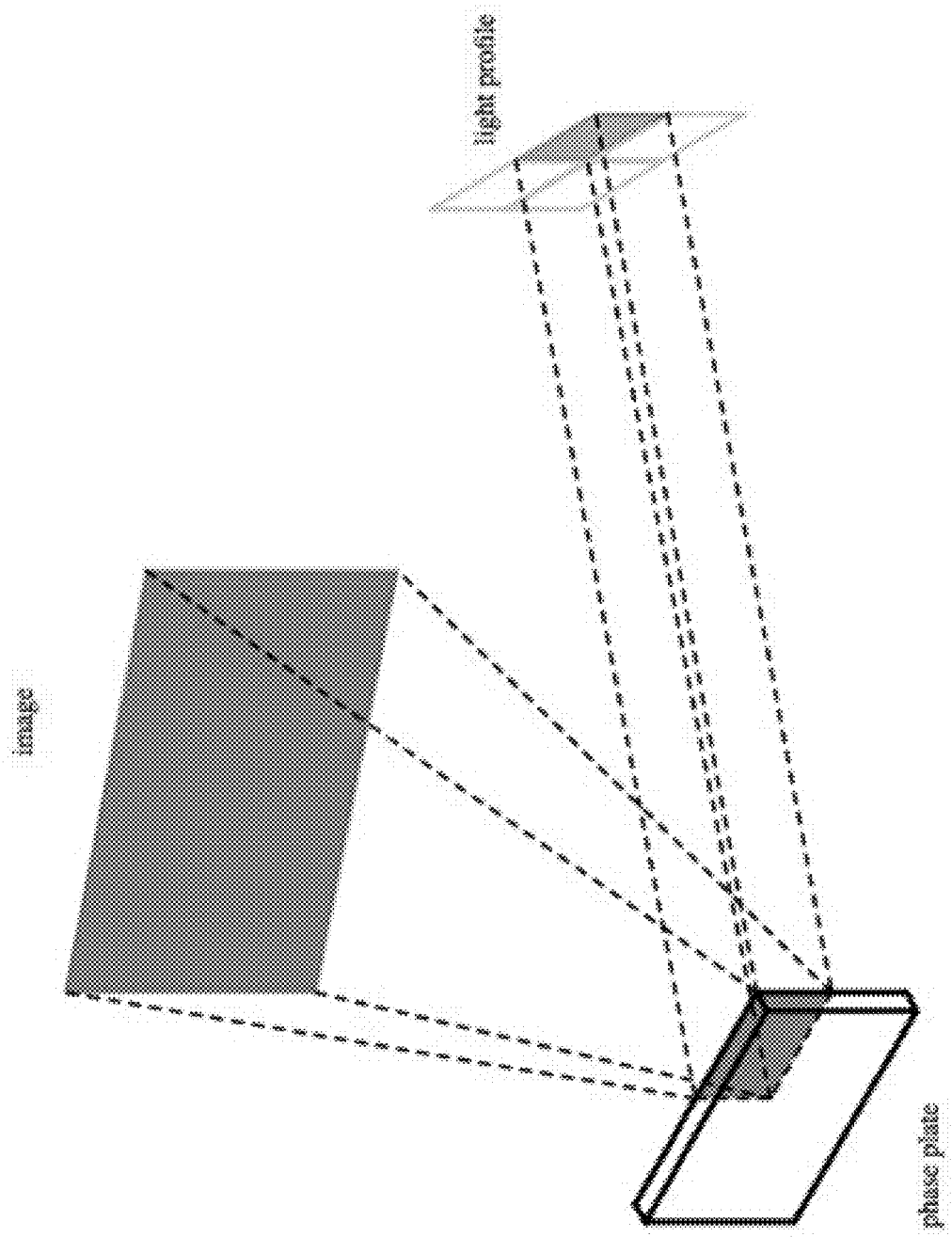
FIGS. 14A and 14B schematically illustrate different possible modes for controlling a dynamically-addressable focusing element to display an image.

An array of parallel beams is relayed onto an active area of the PMD, each covering a segment of the active area, and supplying light to form a sub-image in the far-field. This is illustrated in FIG. 14A. Misalignment caused by imperfect parallelism of the light beams may be corrected by superimposing a prism on the modulation pattern applied to a corresponding area of the PMD to shift a sub-image corresponding to that area into alignment so that each sub-image is overlaid correctly at the image location.

Segmented Approach

Figure 14B:
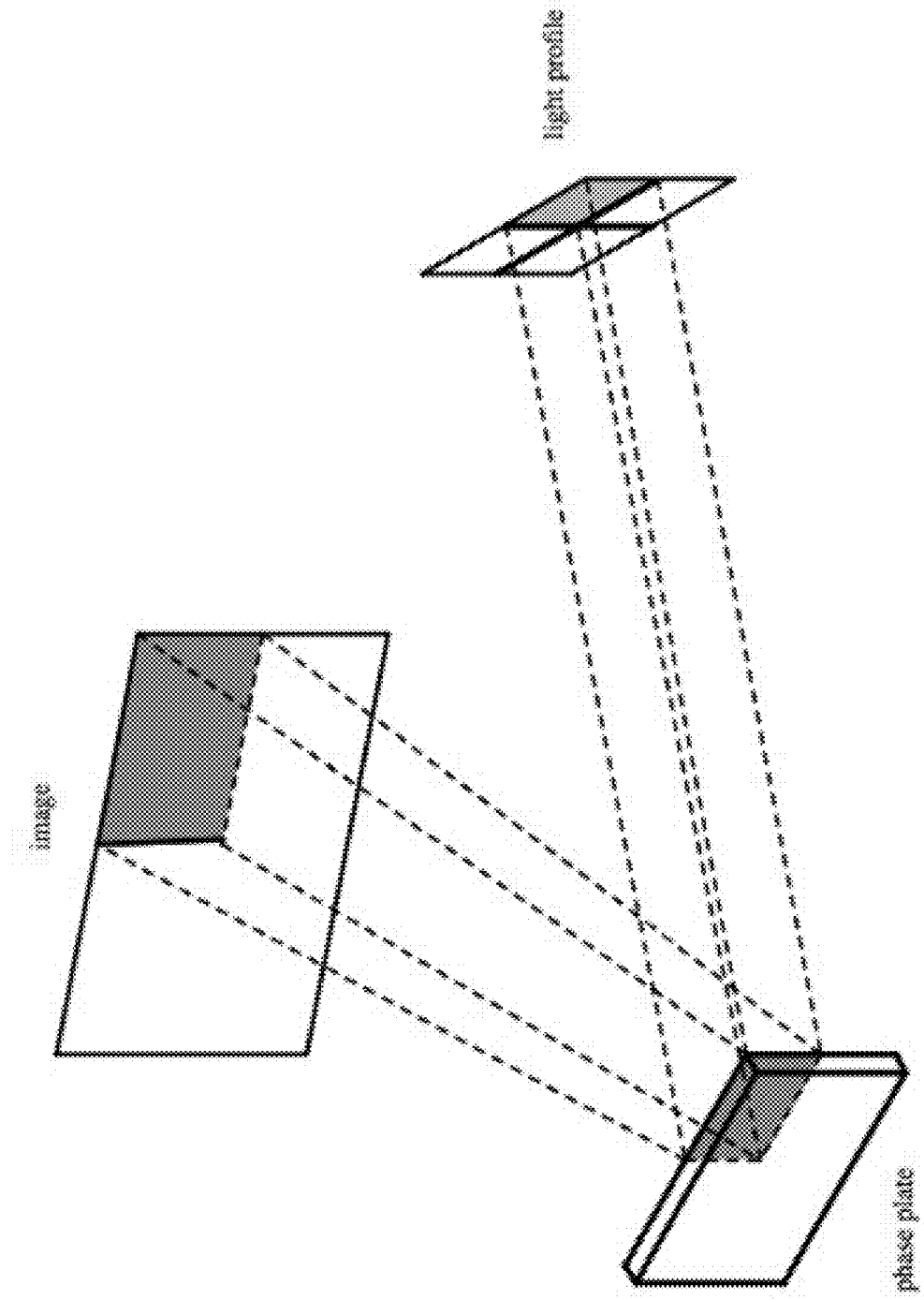

In this approach, a phase pattern is calculated for the PMD with the image divided up into segments, corresponding to incoming beams. This pattern can be calculated using a similar approach to the one described above. In this approach, light field re-distribution using a PMD is restricted to local redistribution within the image segment, such that light from a single beam is only re-directed within the corresponding image segment, as illustrated in FIG. 14B. As described above, a prism may be superimposed on the phase pattern in each image segment as required, for fine alignment adjustment.

Lensing

A PMD may be controlled to simulate the effects of other optical elements, such as prisms and gratings in a similar fashion, for example a prism may be provided by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

This approach can be used to in conjunction with an input light field made up of tiled, non-overlapping patches of light, to shift and scale individual light patches, or small sections of patches to approximate an image.

Free-Form Lensing

Several lenses side-by-side or super-imposed on the PMD can coarsely approximate an image. More complex images or illumination profiles can be achieved by controlling the PMD to present a phase adjustment that is continuously-varying over the area of the PMD. Such a phase-pattern can be achieved by an iterative optimization approach, where the difference between the current solution and the target-image is iteratively minimized until a completion criterion is satisfied.

The optimizer finds a solution using a minimization or optimization approach based on a forward model and its inverse. An initial guess of the light re-distribution scheme as well as regularization terms may be utilized to converge towards a suitable solution in fewer iterations. System constraints may also be supplied. An exit metric, for example the maximum number of iterations, a residual, or a perceptual metric, determines when the program stops and outputs the current solution in form of a light re-distribution scheme.

An optimization approach can be applied where the incoming light is in the form of a 2D array of parallel beams. The input light distribution may be characterized and provided as input to the algorithm, and a lens surface must be calculated that transforms the input light distribution into the desired image in the focal plane.

Lensless Algorithms

Another approach calculates a phase pattern that produces a target light field in a specified focal plane some distance from the PMD, instead of in the far-field. This algorithm can yield a desired output light pattern without additional lenses in the light path. Such lensless algorithms can be used with a well-characterized tilled array of non-overlapping beams. The phase pattern to be provided on a PMD may be generated based on the incoming light distribution.

Shifting to Dump for Local Dimming

Dynamic dimming of some light sources, including laser diodes or LEDs, whether by pulsing or by dynamically varying current, can adversely affect light source stability and lifetime. The dynamic shifting approach used to algorithmically correct beam alignment can be used to shift an entire beam into a beam dump to achieve a global dimming effect if the scene calls for it, without pulsing or modifying source input power.

Diode Property Diversity for Artifact Mitigation

Strategically combining light sources with different properties can be used for minimizing the appearance of certain undesirable artifacts. Artifacts such as speckle can occur for example, when using coherent, monochromatic light to display an image. Combining multiple beams form an overall image can result in a reduction in algorithm noise, image speckle, and screen speckle when compared to imaging with a single source. Furthermore, if light sources are selected to have slightly different wavelengths, or configured for varying input angles, an averaging effect may minimize the appearance of certain image artifacts.

Example Application in a Projection System

Figure 15:
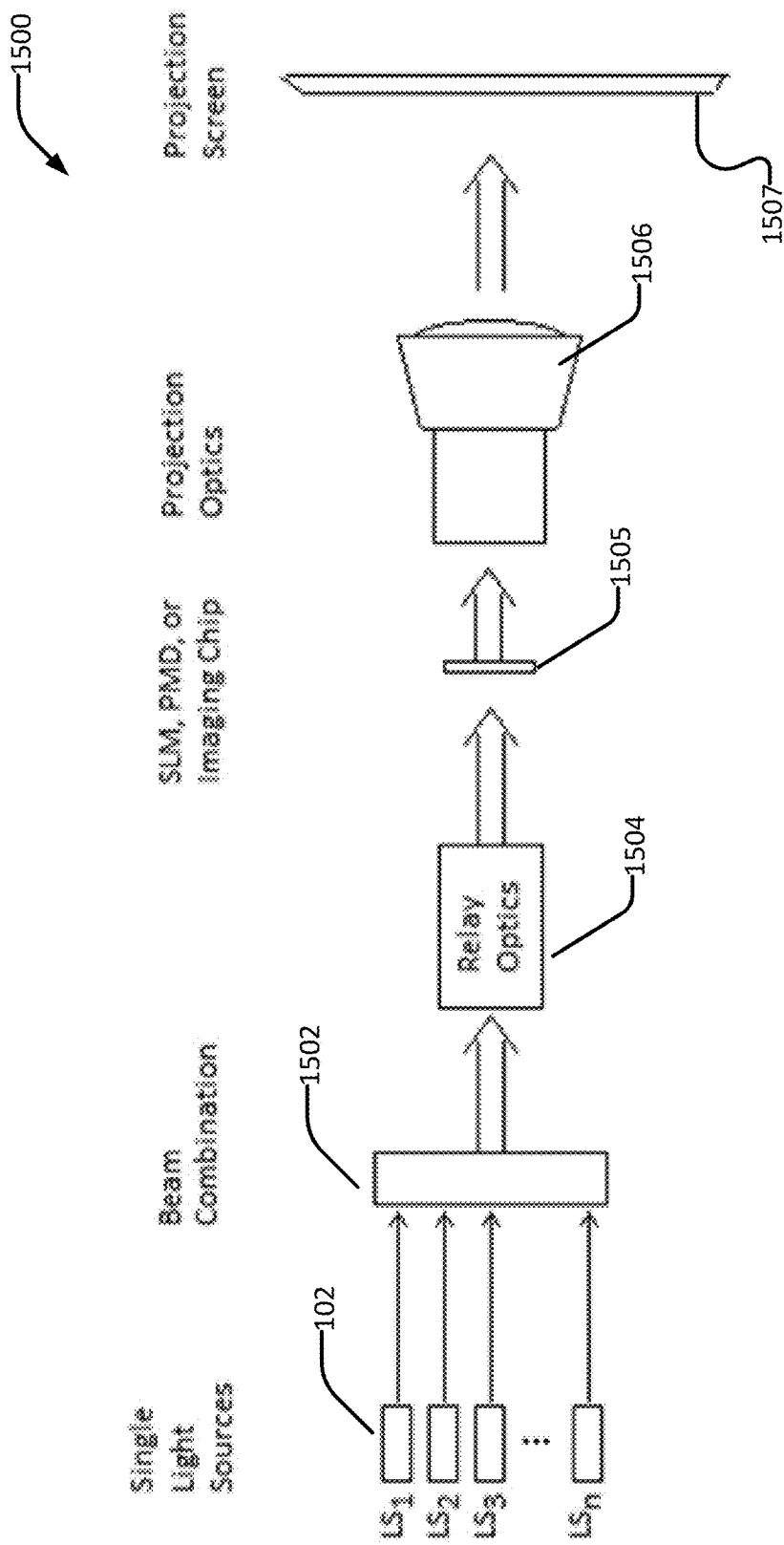
FIG. 15 is a block diagram illustrating an example projector.

FIG. 15 shows a light projection system 1500 according to an example embodiment. Light beams from an array of light sources 102 are combined at 1502 into a 2D array of non-overlapping, parallel, collimated beams, and relayed by relay optics 1504 onto a spatial light modulator 1505. A computer sends a control signal to the spatial light modulator, which alters the incoming light field to achieve a target illumination profile. The output of this spatial light modulator is then relayed through projection optics 1506, and focused onto a surface, in this case, a projection screen 1507.

Example Application to Stereolithography

Stereolithography 3D printers use UV, IR or visible light to cure a resin. Such systems may include a resin bath and a 2D scanning laser beam that cures one layer (Z-Axis) at a time. Upon completion of each layer the partially completed model is lowered by one step into the bath and the next layer is "written". This process typically takes some time to complete, for example 10 minutes per layer or 6 hours for an entire 3D model.

Some approaches replace the visible light source within a projection system with a UV light source, and then, instead of scanning in a 2D fashion to create a layer, expose the entire layer at once. There are two limitations using this technique: first the intensity that a typical projector can create is limited, and hence the layer needs to be exposed for a longer time, secondly, the contrast of a typical projector is limited, and as such areas in which resin is not supposed to be cured, will receive a small amount of light, which may be enough to cure resign and effectively limit the resolution at which a model can be printed.

Using a light re-direction projection approach, for example as discussed herein, to project light to imagewise expose a layer in a 3D printer can result in improvements in both higher printing speed (because local intensity is higher) and higher accuracy (because there is limited or no light leakage).

Example Embodiment

FIGS. 16A and 16B provide illustrations of how embodiments as described herein may be applied to display color images or other light patterns and also how optical power may be scaled up (either by changing modes within one projector or between different projectors). Some embodiments perform color imaging by generating and modulating light of three colors (e.g. red, green and blue). These colors may be generated and modulated in parallel (e.g. using different PMDs) or displayed in a time-multiplexed manner (e.g. the same PMD may modulate different colors of light in different time periods).

Light emitters of different colors may have different optical power outputs. also, certain imaging or illumination applications may need different optical power levels for different colors. The desire to use light emitters of different colors that may have different optical power outputs and or the need for different optical power levels in different colors for certain applications may be accommodated in various ways. In some embodiments the number of light emitters of different colors is different. An optical system for each color may tile the active area of a PMD or other dynamically-addressable focusing element with a number of light patches corresponding to the number of light sources being used for that color. Additionally, the arrangement of patches of light may differ among different colors. For example, for some colors the active area of a PMD may be covered by a single row or column of patches of light while for other colors the active area of the PMD may be covered by an array or patches of light having plural rows and plural columns.

Furthermore, the overall optical power available may be increased by increasing the number of light emitters. This may be done for a single-color projector or for any one or more colors in a multi-color projector. FIGS. 16A and 16B illustrate two possible arrangements one (FIG. 16A) for a lower power projector and another (FIG. 16B) for a higher power projector. In this non-limiting example embodiment the number of red and green light emitters is doubled in FIG. 16B. The same number of blue light emitters provides adequate optical power in both embodiments (of course the number of blue light emitters could also be increased if desired). FIGS. 16A and 16B could represent different projectors or different operating modes of a single projector.

In some example embodiments like FIGS. 16A and 16B light is supplied by laser diodes, the fast axis of the laser diodes are collimated. The beams diverges along the slow axis in order to fill the active area of a PMD. In other embodiments, the patches of light that collectively illuminate the active area of the PMD may be of different shapes or may be arranged to provide different tilings of the PMD active area.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed sequentially (in series), these processes or blocks may instead be performed in parallel, or may be performed at different times.

Where a component (e.g. a light emitter, mirror, lens, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A light source to supply light for a light projector, comprising:
   a plurality of individual lasers spaced in an array, each of the lasers operable to emit a corresponding beam of light;
   a plurality of lenses, each associated with one of the individual lasers and positioned to collimate light from the corresponding lasers;
   one or more mirrors associated with each individual laser positioned to redirect the beams of collimated light to provide an aligned and non-overlapping array of patches of parallel light beams that are spaced more closely than the spacing between the individual lasers; and
   a dynamically addressable phase modulating device having an active area divided into a number of elements that are each positioned to receive a substantially non-overlapping patch of collimated parallel light beams from one of the individual lasers, wherein the elements of the phase modulating device are individually controllable to adjust the phase of the patch of collimated parallel light beams received by the element.

2. A light source according to claim 1 wherein individual lasers are arranged in a two-dimensional array and spaced by a length and a width that are both larger than a length and a width of the array of patches of collimated parallel light beams produced by the mirrors.

3. A light source according to claim 2 wherein the one or more mirrors comprise a first set of parallel knife-edge mirrors and a second set of parallel knife-edge mirrors oriented transversely relative to the knife-edged mirrors of the first set of knife-edged mirrors.

4. A light source according to claim 1 comprising magnifying and relay optics between the mirrors and the elements of the phase modulating device.

5. A light source according to claim 1 wherein the lasers emit polarized light and the lasers and mirrors are arranged such that polarization directions of the non-overlapping patches of collimated parallel light beams are substantially the same.

6. A light source according to claim 1 wherein the path lengths along the patches of collimated light beams from each of the lasers to the elements of the phase modulating device are substantially equal.

7. A light source according to claim 1 further comprising control electronics to control the intensities of light produced by the plurality of lasers.

8. A light source according to claim 1 wherein the lasers comprise laser diodes and the laser diodes are provided by at least one laser diode bar comprising a plurality of spaced-apart laser diodes.

9. A light source according to claim 1 wherein the lenses act only on one axis and the light beams are divergent on a second axis orthogonal to the one axis.

10. A light source according to claim 1 wherein the lasers have fast and slow axes on which the emitted light beams diverge differently and the lenses collimate the light beams on both the fast and slow axes.

11. A light source according to claim 1 comprising a spatial light modulator illuminated by light that has interacted with an element of the phase modulating device.

12. A light source according to claim 11 wherein the spatial light modulator comprises a LCD panel.

13. A light source according to claim 11 wherein the spatial light modulator comprises a digital micro device (DMD).

14. A light source according to claim 13 comprising a driver for the lasers wherein the driver is configured to operate the lasers to emit pulses of light and the driver for the lasers is configured to synchronize the pulses of the lasers with a mirror flip cycle of the DMD wherein the light source comprises a synch signal generator comprising an optical detector located at a light dump for the DMD and a minor timing recovery circuit configured to detect mirror flips of the DMD and to generate a synch signal based on the detected mirror flips.

15. A light source according to claim 14 wherein the driver for the lasers is configured to operate the lasers to emit the pulses of light at a frequency that is significantly higher than a frequency of the mirror flip cycle.

16. A light source according to claim 1 wherein the lasers are configured to emit light of different wavelengths.

17. A light source according to claim 1 further comprising a Peltier element configured to maintain an operating temperature of the lasers within a desired operating range.

18. A light source according to claim 1 wherein distances along the patches of parallel collimated light beams from the lasers to the one or more mirrors are large compared to distances along the light beams from the one or more mirrors to the elements of the phase modulating device.

* * * * *